(12) United States Patent
Garvey et al.

(10) Patent No.: US 9,212,827 B2
(45) Date of Patent: Dec. 15, 2015

(54) FLOW HEATERS

(75) Inventors: Vincent Joseph Garvey, Colby (IM);
Nicholas Edward Gibbs, Baldrine (IM);
Colin Moughton, Port St Mary (IM);
Yicai Zheng, Guangdong (CN)

(73) Assignee: Strix Limited, Ronaldsway (IM)

( * ) Notice: Subject to any disclaimer, the term of this patent is extended or adjusted under 35 U.S.C. 154(b) by 759 days.

(21) Appl. No.: 13/518,290

(22) PCT Filed: Dec. 20, 2010

(86) PCT No.: PCT/GB2010/052166
§ 371 (c)(1),
(2), (4) Date: Dec. 4, 2012

(87) PCT Pub. No.: WO2011/077135
PCT Pub. Date: Jun. 30, 2011

(65) Prior Publication Data
US 2013/0094841 A1 Apr. 18, 2013

(30) Foreign Application Priority Data

Dec. 21, 2009 (GB) .................................. 0922264.7
Sep. 22, 2010 (GB) .................................. 1015893.9

(51) Int. Cl.
*A47J 31/00* (2006.01)
*F24H 1/18* (2006.01)
*F24H 1/00* (2006.01)
*A47J 31/54* (2006.01)
*F24H 1/14* (2006.01)

(52) U.S. Cl.
CPC ............. *F24H 1/0018* (2013.01); *A47J 31/542* (2013.01); *F24H 1/142* (2013.01)

(58) Field of Classification Search
None
See application file for complete search history.

(56) References Cited

U.S. PATENT DOCUMENTS

| | | | |
|---|---|---|---|
| 1,406,850 A | 2/1922 | Hadaway | |
| 2,012,101 A | 8/1935 | Powers | |
| 2,772,342 A | 11/1956 | Reynolds et al. | |
| 2,889,444 A | 6/1959 | Stiebel | |
| 3,469,075 A | 9/1969 | Barbier | |
| 4,000,396 A | 12/1976 | Abel | |
| 4,193,755 A | 3/1980 | Guarnaschelli et al. | |
| 4,208,957 A * | 6/1980 | Bollman et al. | ................ 99/282 |
| 4,354,094 A | 10/1982 | Massey et al. | |

(Continued)

FOREIGN PATENT DOCUMENTS

| | | |
|---|---|---|
| CN | 2461446 | 11/2001 |
| CN | 2563486 | 7/2003 |

(Continued)

OTHER PUBLICATIONS

"Kettlesense: A 'No Pour' Kettle", Alloy Total Product Design, 2001.

*Primary Examiner* — Thor Campbell
(74) *Attorney, Agent, or Firm* — O'Shea Getz P.C.

(57) ABSTRACT

A flow heater comprises a heating element (48; 248) and a first heating region (18, 20; 218, 220) heated by the heating element (48; 248) for heating liquid flowing therethrough to a first temperature below boiling. The flow heater also comprises a second heating region (22; 222) for heating the liquid to a second temperature below boiling. The second region (22; 222) has means (25; 225) for permitting the exit of steam therefrom separately from heated liquid. The flow heater cannot be operated so that bulk boiling of said liquid takes place in the second region (22; 222).

25 Claims, 19 Drawing Sheets

(56) References Cited

U.S. PATENT DOCUMENTS

| | | | |
|---|---|---|---|
| 4,380,973 | A | 4/1983 | Steinke |
| 4,460,819 | A | 7/1984 | Eugster |
| 4,480,173 | A | 10/1984 | Butterfield |
| 4,565,121 | A | 1/1986 | Ohya et al. |
| 4,575,615 | A | 3/1986 | Shigenobu |
| 4,602,145 | A | 7/1986 | Roberts |
| 4,786,782 | A | 11/1988 | Takai et al. |
| 4,818,845 | A | 4/1989 | Koizumi et al. |
| 4,823,767 | A | 4/1989 | Wust |
| 4,959,526 | A | 9/1990 | Kurachi et al. |
| 5,006,689 | A | 4/1991 | Kurachi et al. |
| 5,113,931 | A | 5/1992 | Oswalt et al. |
| 5,150,448 | A * | 9/1992 | Salomon ............... 392/480 |
| 5,154,110 | A * | 10/1992 | Chang .................. 99/281 |
| 5,309,821 | A * | 5/1994 | Knepler ................ 99/282 |
| 5,367,607 | A | 11/1994 | Hufnagl et al. |
| 5,397,031 | A * | 3/1995 | Jensen .................. 222/146.5 |
| 5,549,036 | A | 8/1996 | Hourizadeh |
| 5,551,331 | A * | 9/1996 | Pfeifer et al. ............ 99/280 |
| 5,647,055 | A * | 7/1997 | Knepler ................ 392/451 |
| 5,671,325 | A * | 9/1997 | Roberson ............. 392/442 |
| 5,778,765 | A | 7/1998 | Klawuhn et al. |
| 5,797,313 | A * | 8/1998 | Rothley ................. 99/483 |
| 5,943,472 | A * | 8/1999 | Charles et al. ......... 392/396 |
| 6,058,926 | A | 5/2000 | Ruiz |
| 6,118,933 | A * | 9/2000 | Roberson ............. 392/442 |
| 6,371,359 | B1 | 4/2002 | Kimura et al. |
| 7,190,890 | B2 | 3/2007 | Higham et al. |
| 7,801,424 | B2 | 9/2010 | Cheung |
| 7,813,628 | B2 | 10/2010 | Haan |
| 2002/0051632 | A1* | 5/2002 | Kodden et al. .......... 392/471 |
| 2004/0057709 | A1 | 3/2004 | Leary et al. |
| 2004/0226452 | A1 | 11/2004 | Lyall |
| 2005/0279215 | A1 | 12/2005 | Cai |
| 2006/0027103 | A1 | 2/2006 | Boussemart et al. |
| 2007/0086758 | A1 | 4/2007 | Rossi et al. |
| 2007/0147808 | A1 | 6/2007 | Egeresi |
| 2007/0183758 | A1 | 8/2007 | Bradenbaugh |
| 2007/0295216 | A1 | 12/2007 | Williamson et al. |
| 2008/0037968 | A1 | 2/2008 | Kaastra |
| 2008/0226779 | A1 | 9/2008 | Cocchi et al. |
| 2008/0247740 | A1 | 10/2008 | Rijskamp et al. |
| 2009/0038481 | A1 | 2/2009 | Yamamoto et al. |
| 2009/0290858 | A1 | 11/2009 | Altman et al. |
| 2010/0193492 | A1 | 8/2010 | Hughes |
| 2011/0033176 | A1 | 2/2011 | Garvey et al. |
| 2011/0058798 | A1 | 3/2011 | Garvey et al. |
| 2013/0337132 | A1* | 12/2013 | Fenna et al. .................. 426/433 |

FOREIGN PATENT DOCUMENTS

| | | |
|---|---|---|
| CN | 101564271 | 10/2009 |
| CN | 201387123 | 1/2010 |
| DE | 2846339 | 5/1980 |
| DE | 3521989 | 1/1987 |
| DE | 102006037569 | 2/2008 |
| EP | 0084069 | 8/1985 |
| EP | 0881859 | 10/2002 |
| FR | 2259325 | 1/1978 |
| GB | 373801 | 6/1932 |
| GB | 938195 | 10/1963 |
| GB | 944651 | 12/1963 |
| GB | 1359143 | 7/1974 |
| GB | 1454772 | 11/1976 |
| GB | 2162027 | 1/1986 |
| GB | 2340590 | 2/2000 |
| GB | 2452981 | 3/2009 |
| JP | 200497386 | 2/2004 |
| JP | 2009142648 | 7/2009 |
| JP | 2009160286 | 7/2009 |
| JP | 2009247835 | 10/2009 |
| WO | 2008139205 | 11/2008 |

* cited by examiner

FLOW HEATERS

This application is entitled to the benefit of, and incorporates by reference essential subject matter disclosed in PCT Application No. PCT/GB2010/052166 filed on Dec. 20, 2010, which claims priority to Great Britain Application No. 0922264.7 filed Dec. 21, 2009 and Great Britain Application No. 1015893.9 filed Sep. 22, 2010. This application is related to U.S. patent application Ser. No. 13/321,437 filed Feb. 2, 2012.

BACKGROUND OF THE INVENTION

1. Technical Field

This invention relates to flow heaters for heating liquids, e.g. water.

2. Background Information

A number of methods are known to provide hot or boiling water for domestic consumption. Traditionally electric kettles or jugs are used to boil a quantity of water e.g. for making hot beverages.

More recently products have been marketed which promise to deliver small quantities of hot water very quickly. Rather than heat a body of water in a batch, these are based on flow-heaters which heat water as it passes through a narrow passage with a thick film printed element on one side. However such technology has significant drawbacks. One of these is that there is a greater risk of the heating element overheating than with conventional batch heaters which limits the efficiency with which water can be heated.

During boiling of water in a conventional kettle, the bulk of the water is at substantially the same temperature which gradually rises as heating progresses. Only the boundary layer close to the heated surface is significantly hotter. Heat is transferred from the heated surface to the boundary layer by conduction and initially at least, from the boundary layer to the bulk by convection. In heaters with a high surface temperature, the water in the boundary layer can reach 100° C. and boil while the bulk water is relatively cool. The bubbles of steam, initially condense and collapse due to contact with the cooler bulk water.

As heating continues, bubbles of steam, being lighter than the surrounding water rise from the heater surface. As the bubbles rise they conduct heat to the cooler surrounding water and the resultant condensation eventually causes the bubble to collapse. However as the bulk of the water approaches boiling temperature, it no longer causes full condensation of the rising bubbles, and these rise to the surface and break free which is generally considered to indicate that the water is boiling. In practice the bulk water temperature will not quite be at 100° C. at this stage. Conventionally, domestic jugs and kettles will maintain a "rolling boil" for several seconds which enables the bulk water liquid to uniformly reach a temperature very close to 100° C., although it never quite gets there and moreover the actual boiling point is dependent on other factors such as atmospheric pressure and the presence of dissolved substances in the water.

A flow heater, by comparison, has the benefit of being able to heat water on demand and to be operated only for as long as necessary to deliver the required quantity of water. However consumers expect a start-up time that appears virtually instantaneous—certainly no longer than a few seconds. In the context of small domestic products the amount of power is fixed by that available from the wall outlet socket (1500 W to 3000 W typically) and can't be increased. Under steady state conditions, the flow-rate of water will be matched to the heater output power according to the basic laws of thermodynamics (for a 3 kW heater, a flow-rate of around 0.5 liters/minute up to 1 liter/minute will provide water with a temperature range from near boiling down to about 65° C.). The heater type, and heat exchange mechanism have little influence.

When designing a flow heater with very fast start-up it is important to minimize the thermal mass of the heater itself and the temperature to which it needs to be heated. It is also important to maximize the contact area between the water and the heater. These requirements have been addressed in the recent prior art by the use of a thick film heater bonded via an intermediate electrical insulation layer to a stainless steel heat exchanger. The heat exchanger is designed with a complex chamber facing the heater to maximize the contact area. However the Applicant has realized that care must be taken over the distribution of water flow over the heater surface. If any section of water in contact with the surface is allowed to stagnate, it will quickly boil, creating a pocket of steam. A pocket of steam will no longer provide cooling to the element surface. The effect of this is rapid localized heating of the surface, and a failure, usually of the insulation between the heater track and heater substrate surface. To avoid this, the water is therefore constrained to flow in a tortuous narrow channel to avoid stagnant spots.

The Applicant has also appreciated that another problem arises with the use of a narrow water channel. As the water approaches the end of the heater, it will be at its hottest—e.g. 85° C. The water channel, although small, nevertheless still consists of a boundary layer and a bulk water channel; the water in the boundary layer will often boil, creating bubbles of steam. In this configuration, a bubble of steam, emerging into the very small channel is unable to transfer heat by conduction and condensation, as it cannot expose its surface area to surrounding water, instead, the expanding bubble will simply push the remaining water ahead of it. It can be seen, that if this bubble occurs, for example 80% of the way along the channel, it will in fact cause all of the water in the last 20% of the channel to be ejected violently. In addition to the undesirable effect of "spitting" from the users perspective, the depletion of water cover at the end sections of the heater can often lead to premature element failure.

The problems of localized hot spots and spitting place a constraint on the degree to which flow heater design can be optimized to maximize the ratio between the heater surface area and the volume of liquid which is needed to minimize heating times. Furthermore the need to provide adequate sensing of the element temperature to guard against overheating also compromises the heater design.

SUMMARY OF THE DISCLOSURE

When viewed from a first aspect the present invention provides a flow heater comprising a heating element, a first heating region heated by said heating element for heating liquid flowing therethrough to a first temperature below boiling, and a second heating region for heating said liquid to a second temperature below boiling, said second region having means for permitting the exit of steam therefrom separately from heated liquid, wherein said flow heater cannot be operated so that bulk boiling of said liquid takes place in the second region.

When viewed from a second aspect the invention provides a flow heater comprising a heated flow conduit for heating liquid therein to a first temperature below boiling and a final heating chamber for heating said liquid to a second temperature below boiling wherein said heating chamber comprises a space above the liquid surface for allowing the escape of steam from the liquid surface wherein said flow heater cannot be operated so that bulk boiling of said liquid takes place in the final heating chamber.

In the context of the present application a flow heater is defined as one which is able to heat liquid while it flows through and out of the heater.

It will be seen by those skilled in the art that in accordance with the invention a flow heater is provided with a second heating region or final heating chamber which allows steam to escape from the surface of the water without forcing the heated water out—i.e. the phenomenon of spitting is reduced or avoided. Moreover the facility for steam to escape allows the surface of the heater to remain flooded in water and so avoid localized hot spots. Even though the second heating region does not raise the bulk temperature of the liquid to boiling point, as explained above micro-boiling tends to take place at the heater surface leading to localized steam production as the bulk temperature increases.

A standard flow heater can be thought of as one in which there exists in use a temperature gradient along the direction of flow. Whilst the invention allows heated water to be produced, only the water in the second region achieves the final temperature; it is not necessary to heat the whole of the contents of the heater to that temperature as would be the case with a kettle or other 'batch' heater. For example a cold water temperature of 20° C. preheated to 80° C. in the first region will have an average temperature of only 50° C.

In accordance with the invention the second heating region or final heating chamber continues to heat the water from the temperature at which it leaves the first region (e.g. the first region resembling a traditional flow heater), to a higher temperature but not bulk boiling. A separate heater could be provided for this purpose. In a set of preferred embodiments however a single heater is provided which extends into the second heating region or final heating chamber.

Hereinafter reference will only be made to the first heating region and second heating region respectively. However, these references should be understood to apply equally to the heated flow conduit and the final heating chamber respectively recited in accordance with the second aspect of the invention. The omission of these latter two terms is simply for reasons of brevity and no other conclusion should be drawn.

The form of the transition between the first and second heating regions is not considered essential to the invention and several possibilities are envisaged. For example, the first heating region could gradually open out at its downstream end to form the second heating region. In such a case the point of transition between the first and second heating regions could be defined relatively arbitrarily. For example, the transition could be defined in terms of the dimensions of the channel through which the liquid being heated flows such as the point at which the cross section of this channel begins to expand, or when it has fully expanded or at the midway point. Alternatively, a definition in terms of the linear flow speed could be envisaged, e.g. where the linear flow speed is reduced to half the speed in the first region. Functionally the transition occurs when bubbles of steam can escape from a surface of the liquid without displacing the remaining liquid.

In the first region, the controlled parameter is the water velocity (achieving a balance between good heat transfer with high velocity and acceptable hydraulic pressure drop) and in the second region the controlled parameter is water level, achieving a balance between heat transfer, by ensuring the heater is covered, and minimizing water volume by ensuring the water level is as low as possible. Minimizing water volume in the first and second regions maintains the fastest start-up time.

In accordance with the second aspect of the invention the heated flow conduit could be heated in a number of ways. In one set of embodiments it is provided with an electric heating element for heating the liquid therein as in accordance with the first aspect of the invention. However this is not essential. It could alternatively for example be provided by one side of a heat exchanger, through the other side of which a hotter liquid or gas is passed.

The heating element for the first region, or the heated flow conduit where this is provided with a heating element, could take any convenient form. In one set of embodiments, the heating element is provided on the outside of a channel or conduit forming the first heating region. The element could take the form of a so-called thick film printed element. Such elements are conventionally planar, but can also be produced with non-planar substrates. Alternatively it could comprise a sheathed resistance heating element, with or without an intermediate metallic heat diffuser plate as is commonly found in so-called underfloor heaters for domestic kettles. The advantages of having an element on the outside of the channel are that it is relatively easy to manufacture and it allows overheat protection to be provided in close thermal contact with the element to switch off the element in the event of it being energized without water in the channel.

In another set of embodiments an immersion element is provided within a channel or conduit forming the first heating region. Accordingly, in preferred embodiments the first heating region comprises a channel for conveying liquid having a sheathed heating element disposed therein for heating the liquid. The element could be mounted to or in contact with a wall of the channel, although in a set of preferred embodiments it is disposed within the channel so that liquid is in contact with it all the way around its periphery. In a set of preferred embodiments, the first heating region comprises a preferably tubular jacket around the heating element such that liquid can flow between the element and the jacket. This is beneficial in giving a large surface contact area between the liquid and the heater surface, and also helps to minimize the tendency for spitting should any bubbles be formed since a single bubble cannot occupy the entire cross-section of the channel. Under normal operation, i.e. with bulk water temperature not exceeding 85 or 90° C., then a bubble forming will result in a higher water velocity in the remaining stream, improving heat transfer, and minimizing the likelihood of the bubble growing circumferentially.

The jacket could conform in profile to the heating element (e.g. be of circular cross section if the heating element is of circular cross section) but this is not essential; it could be in the than of a block having a channel defined therein to accommodate the element and the liquid around it.

Any suitable material could be used for the jacket. In one set of preferred embodiments, the jacket comprises stainless steel. This gives the overall heater robustness and in particular ensures that it is tolerant to overheating, for example by being operated without being in contact with liquid. The jacket should ideally have a low thermal mass and in the case of a stainless steel jacket this means that in preferred embodiments it should be relatively thin. Where a stainless steel or other metallic jacket is provided, it is preferably less than 0.7 mm thick, more preferably approximately 0.4-0.6 mm thick. The applicant has discovered, contrary to the prevailing wisdom in the art, that in fact a standard sheathed immersed element (e.g. of 6.6 mm diameter operating at 35 W/cm$^2$) with a thin stainless steel jacket as outlined above in fact has a lower thermal mass than a typical corresponding thick film heating element arrangement.

Preferably the heating element has a circular cross-section. Preferably the channel or jacket (or at least the inner wall thereof) has a circular cross-section. Where the heating element cross-section is non-circular, the cross-section of the jacket or channel (or at least the inner wall thereof) is preferably the same shape.

It is important to be able to exercise suitable control over the operation of flow heaters in accordance with the invention. One aspect of this is preventing serious overheating of the heater when it is accidentally operated without liquid. There are of course a number of ways in which this could be done. Advantageously the overheat protection is provided in the second region. This addresses a fundamental problem with providing dry-switch-on overheat protection in a flow heater comprising a sheathed heating element disposed in a channel and surrounded by liquid; the presence of the channel physically prevents placing a sensor in good thermal contact with the element. In a particularly convenient embodiment, a sheathed immersed heating element is employed, part of which is bonded to a metal "head" plate to form a hot return in exactly the same way as is well known for traditional immersed kettle elements. The advantage of this is that it then allows a conventional control for immersed elements, such as the applicant's extremely popular and successful R7 series of controls, to be used for giving both primary and secondary overheat protection for the element. Details of such controls are given in GB-A-2181598. Further preferably, such a control is also used to provide electrical contact to the element either directly or indirectly.

The thermal sensor could, for example, be a thermistor, thermocouple or other electronic sensor or could be a thermomechanical sensor such as a shape-memory metal actuator or a bimetallic actuator. It could be in direct physical contact but preferably the good thermal contact is achieved via a thermally conductive wall of the second region—e.g. the traditional head and hot return arrangement described above.

Preferably the part of the element which is in good thermal contact with the thermal sensor is higher than the rest of the heated part of the element.

Additionally or alternatively, it may be desirable to measure the temperature of the liquid in or exiting from the heater. This could, for example, assist in overheat detection or it could be used as part of a feedback control system to control the flow-rate of water passing through the heater. When heated water is required it is advantageous to be able to exercise control over the flow rate since the optimum flow rate is determined by the precise power of the heater, the performance of any pump provided, the supply voltage and the incoming ambient water temperature. The first two of these factors are subject to manufacturing tolerances whilst the latter two can vary during use.

In one set of preferred embodiments, means are provided for controlling the temperature of liquid supplied by the heater. The Applicant has appreciated that the output temperature of the liquid is a function both of the power of the heater and of the flow rate. Accordingly, either of these two parameters could be varied. In a set of embodiments, the means for controlling the temperature comprises means for altering the flow rate of liquid through the heater. For example, for a typical 3 kilowatt heating element, the Applicant has discovered that water can be supplied at approximately 90° C. (assuming it starts at approximately 17° C.) if the flow rate through the heater is approximately 590 ml per minute. If the flow rate is increased to 1000 ml per minute, the water is supplied at a temperature of approximately 60° C.

The initiation of liquid flow (e.g. through activation of a pump or opening of a valve) could take place as soon as the heating element is energized. However in preferred embodiments the heater is arranged to initiate water flow after a delay interval relative to energization of the heating element. The Applicant has appreciated that by introducing a deliberate delay it can be ensured that substantially all of the liquid is dispensed at the desired temperature—i.e. there is no initial slug of cooler liquid at the beginning of the dispense operation. The delay could be fixed but is preferably determined as a function of the temperature of the liquid sitting in the heater so that if the liquid in the heater is warm, the delay is reduced, potentially down to zero (no delay) or even negative—i.e. the pump may be started before the heater if, for example, the system is being restarted after a short 'off' time and a lower desired temperature has been chosen.

Similarly the flow could be switched off simultaneously with the heating element, but in a set of preferred embodiments the heating element is switched off before the flow is stopped. This allows the heat stored in the element and other components to be partly recovered to heat water. This is not only more energy efficient, but means that the heater can be used more quickly thereafter to dispense cooler liquid.

The length of time for which liquid is dispensed could be fixed or indefinite—e.g. for as long as a user holds down a button. In a set of preferred embodiments liquid is dispensed for a time preset by a user. The time could be set directly, but preferably it is set by means of a dispensed volume control, in which case the dispense time will also be a function of the flow rate, which might in turn be a function of the dispense temperature as explained above. Having the liquid being dispensed for a predetermined time is beneficial in allowing the heating element to be turned down or off towards the end of the dispense operation to recover stored heat as outlined above.

The Applicant has appreciated that where the temperature to which liquid is heated increases, it is very difficult to measure its temperature accurately since the liquid in the second region will be moving turbulently and may contain many bubbles of steam, so that any point temperature sensor such as a thermistor tends to give inaccurate and wildly fluctuating results. However, the Applicant has devised an arrangement which allows much more accurate and stable determination of the output temperature of the liquid.

According to preferred embodiments of the invention, temperature sensing means are provided in the first heating region for determining the output temperature of a liquid. Thus, in accordance with these embodiments a temperature measurement of the liquid is made upstream of where it is finally dispensed, rather than measuring the actual output temperature of the liquid. This stems from the applicant's realization that there is a strong correlation between the temperature of the liquid at a known point in the first heating region and the output temperature. Given that both the liquid capacity and the heating power of the heating element downstream of the measuring point are known, the output temperature can be calculated. The advantage of measuring the temperature in the first region is that since the liquid is less turbulent in that region, a much more accurate temperature measurement can be made.

Accurate knowledge of the temperature of the water in the second region (e.g. obtained through measuring temperature in the first region) is beneficial in allowing control of the apparatus in a number of ways. Firstly of course it allows the output temperature of the water to be varied. However, it also allows account to be taken of non-equilibrium situations arising from previous operations of the apparatus. For example, if the apparatus is being used to dispense hot water and a subsequent demand for cooler water is made by a user, the flow of liquid may be commenced earlier relative to energization of the heater, or it may even not be necessary to energize the heater at all depending on how much the liquid has cooled.

Where temperature is measured in the first region the Applicant has realized that it is desirable in some circumstances to encourage a swirling flow component about the longitudinal axis of the channel or conduit since this ensures a more reliable single-point temperature measurement. Being able to measure temperature is preferable to requiring multiple sensors on cost grounds. In one set of embodiments the channel or conduit comprising the first region comprises an inlet arranged so as to introduce liquid thereto along a direction offset from the central axis of the channel or conduit in order to give the desired swirling which promotes mixing of the liquid inside the channel and hence a more even temperature distribution. For example the inlet could be arranged to introduce the liquid with a tangential component of flow.

In another, not mutually exclusive, set of embodiments the channel or conduit in the first region is configured to promote a swirling flow. There are many possible ways in which this could be achieved. In a subset of such embodiments the internal surface of one or more of walls of the channel is/are provided with helical features. For example the surface could be provided with ribs, grooves, or any other patterns of protrusions or depressions which encourages swirling flow. The features could extend either part-way or all the way around the perimeter of the internal surface and could extend all or part-way along the length of the channel. The features need not be continuous; they could comprise a series of bumps or other protrusions.

Where the channel is provided with an immersed element inside the channel, the helical features could be provided additionally or instead on the outer surface of the element. Another alternative, again not mutually exclusive with the options given above, is for an independent flow shaping element to be introduced into the channel. In a particularly convenient set of embodiments such a flow shaping element comprises a wire wrapped around a sheathed heating element immersed in the channel. This is not only economical to produce but is also relatively straightforward to assemble. A similar alternative might comprise a resilient coil wrapped around the element while it is inserted during manufacture and subsequently released so as to expand against the inner surface of the channel wall. In some embodiments the thickness of the wire is significantly less than, e.g. no more than 50% of, the width of the gap between the element surface and the channel wall; in other words the wire does not define separate individual helical channels but rather it simply encourages a swirling flow by causing a swirling motion of the boundary layer of liquid. In some such embodiments the thickness of the wire is less than a third of the width of the gap.

In other embodiments the width of the wire is greater than 50% of the width of the gap—e.g. approximately equal to the width of the gap so that the wire defines separate individual helical channels through which the water flows.

The flow shaping means—e.g. the aforementioned flow shaping element—could extend along the full length of the conduit, but in a preferred set of embodiments it extends only part-way along the length of the conduit. Further preferably an end of the flow shaping means is axially offset from the outlet of the channel or conduit. This has been found to be advantageous since the structure of the flow shaping means in the channel or conduit itself causes localized linear variations in the pressure and flow of the liquid through the channel or conduit, particularly where it occupies more than 50% of the cross-sectional flow area of the channel, since the flow tends to concentrate along the 'leading edge' of the flow shaping means. This can lead to variations in the sensed temperature of the liquid. Having the end of the flow shaping means offset from the outlet of the channel or conduit allows the swirling liquid to mix together sufficiently that at the point of the temperature measurement (typically in the vicinity of the outlet from the channel or conduit), any variation in temperature that was present in the liquid owing to the flow shaping means is reduced.

This is considered to be novel and inventive in its own right, not just in the embodiments described above and therefore from a further aspect the present invention provides a flow heater comprising a channel for conveying liquid, said channel having an inlet and an outlet, and a heating element disposed in or on the channel, wherein the channel comprises flow shaping means having an end axially offset from said outlet so as to extend only part-way along the length of the channel.

Preferably the flow shaping means is configured to introduce a swirling motion to liquid in the channel. The flow shaping means could comprise a flow shaping element introduced into the channel but this is not essential. As described above it could comprise features such as ribs, grooves etc. on the wall of the channel or, where provided, a sheathed element disposed in the channel.

The end of the flow shaping means could also be offset from the inlet to the channel or conduit. This reflects the Applicant's appreciation that it is not normally necessary to introduce swirl for the first section of flow if temperature is not being measured until the end. This simplifies assembly and further reduces material costs.

In one set of embodiments the end of the flow shaping means is offset from the outlet by a distance which is greater than the diameter (or, equivalently, the minimum cross-sectional dimension) of the channel or conduit, e.g. greater than twice the diameter, e.g. greater than three times the diameter. This allows the liquid to become well mixed to minimize any temperature variations before it reaches the vicinity of the outlet from the channel or conduit where the temperature is typically measured. Furthermore, by having the flow shaping means offset say 30% of the length of the channel or conduit from the outlet, the bulk water temperature in the location of the flow shaping means will not be close to boil, therefore, even in spite of the risk of localized stagnation or vortices, the risk of inadvertent localized boiling is reduced.

Preferably the flow shaping means has a helical configuration. In one set of embodiments the helical configuration comprises a plurality of turns whereby, for at least part of its length, the distance between adjacent turns decreases away from the end closest to the inlet. The benefit of this arrangement is that the liquid flowing from the inlet initially experiences the gentler gradient of the flow shaping means, thereby minimizing turbulence, but as the gradient of the helical flow shaping means increases, a rapid rotation and therefore mixing of the liquid is achieved which allows reliable temperature measurement of liquid which has exited the flow shaping means.

This is considered to be novel and inventive in its own right and therefore from a further aspect the present invention provides a flow heater comprising a channel for conveying liquid, said channel having an inlet and an outlet, and a heating element disposed in or on the channel, wherein the channel comprises flow shaping means having a helical configuration comprising a plurality of turns whereby, for at least part of its length, the distance between adjacent turns decreases away from the end closest to the inlet.

In accordance with all aspects of the invention, the liquid flow could be driven by hydrostatic pressure achieved by arranging a reservoir of liquid above the outlet and using a valve or tap. Preferably, however, a pump is provided for driving liquid through the flow heater.

In a set of preferred embodiments of the first aspect of the invention the first region comprises a pair of channels fluidically in parallel with one another, both communicating with the second region. By arranging for these channels to be at least approximately physically parallel too, the overall size of the heater assembly can be reduced for a given aggregate fluid path length which gives greater freedom when producing an acceptable industrial design. Separate heating elements may be provided for the respective channels but preferably a single common element is provided. Advantageously this comprises a sheathed heating element formed into an approximate U shape so that each arm thereof is disposed in a respective one of the channels and the curved section or sections is/are provided in the second region. The Applicant has recognized that in such an arrangement it is important to ensure that the flow in each channel is adequately balanced to prevent overheating of one portion of the element relative to the other. It has further devised several ways of achieving this as will be explained below.

The heater could comprise a pump for each of the channels, each with an independent flow rate feedback control circuit, but in a preferred set of embodiments the heater comprises a common pump supplying both channels since this reduces cost and complexity. The Applicant has realized that in such arrangements there is the possibility of the flow being imbalanced between the two channels in some circumstances. This could be, for example, that the heating element tube is slightly off-center in one channel (if such an arrangement is used) compared to the other, there is an uneven build-up of scale, or a steam bubble is created.

The Applicant has recognized that if factors affecting the channels' flow resistances unequally are allowed to have significant impact on the corresponding flow rates, then control could be lost over the temperature of the heater, with the serious risk of overheating. However it has further recognized that if the overall heater system is configured such that the heated channels represent a minor proportion of the overall pressure drop in the system, the impact of such unequal factors can be reduced. Therefore in one set of embodiments the heater system comprises means upstream of the heated flow channels for restricting the flow of liquid thereto such that in use the pressure drop across the flow restricting means is greater than 50% of the total pressure drop from the pump to the outlets of the channels.

This is considered to be novel and inventive in its own right and therefore when viewed from a further aspect the present invention provides apparatus for heating liquid comprising: two heated flow channels each comprising heating means for heating liquid flowing therethrough and each channel having an inlet and an outlet; a common pump for supplying liquid to the heated flow channels, and means upstream of the heated flow channels for restricting the flow of liquid thereto such that in use the pressure drop across the flow restricting means is greater than 50% of the total pressure drop from the pump to the outlets of the channels. Said total pressure drop may be equivalent to a head of water greater than 500 mm.

It will thus be appreciated that, as explained above, the means for restricting the flow into the two heated flow channels helps to minimize the effect of imbalance between the resistances of the two heated flow channels, and therefore provides some protection for the heating means against overheating.

A common flow restriction means could be provided for the two channels, but in some preferred embodiments individual restrictors are provided for each channel. By trimming the resistance of each such restrictor—e.g. at the factory—any minor imbalance between their flow resistances arising through manufacture can be compensated.

The means for restricting the flow could simply be provided by the molded or machined shape of tubes, manifolds etc. but conveniently separate restricted bore components are used. This option provides flexibility to trim the flow resistances as mentioned above—either by trimming the length of the component and/or by selecting from a range of components of differing bores.

In one set of embodiments the pressure drop across the means for restricting the flow is greater than 75% of the total pressure drop, e.g. greater than 85%, e.g. greater than 90%. As will be appreciated, the higher the pressure drop across the restriction means, the less significant the effect of any imbalance between the flow resistances of the heated flow channels, and therefore the greater the improvement in reliability which can be achieved. However this comes at the price of having to provide a higher power pump to provide the design flow rate through the artificially increased flow resistance.

In a set of embodiments offering another (not mutually exclusive) way to address flow resistance imbalance between the channels, each of the parallel channels is provided with flow regulating means configured to offer a flow resistance dependent on flow rate through the corresponding channel so that as flow rate in the channel increases, e.g. as the result of a blockage reducing flow in the other channel, the flow resistance of the flow regulating means increases to compensate. Although this will lead to an overall reduction in aggregate flow rate through the two channels, this is preferable to the flow rates in the channels being out of balance. An overall reduction in flow rate can, for example, be compensated by increasing the speed of the pump.

This is considered to be novel and inventive in its own right and therefore from a further aspect the present invention provides a flow heater comprising at least two fluidically parallel channels, wherein each channel comprises:
a heating element disposed on or in the channel to heat liquid flowing therethrough; and
flow regulating means configured to offer a flow resistance dependent on flow rate through the corresponding channel so that as flow rate in the channel increases the flow resistance provided by the flow regulating means increases.

The flow regulating means could take a number of different forms, some of which may be known per se in the art. However in a particularly convenient set of embodiments it has been found that such an effect can be achieved using a helically configured flow shaping element of the type discussed above for introducing swirl into the flow in the channels, by forming it of resilient material. This is because as the flow rate increases it tends to force the element to contract against its resilience, reducing the separation of adjacent turns. This gives a smaller effective section for the helical path which the liquid is encouraged (or forced) to follow, thereby increasing the flow resistance. Although not essential, typically such a flow shaping element would be provided outwardly of a sheathed heating element disposed in the channel—i.e. between the element and the inner wall of the channel.

The flow shaping element is preferably fixed at its downstream end—e.g. to the wall of the channel or the element if that is provided in the channel, and allowed to move at the upstream end (to permit the required contraction).

It will be appreciated that by employing such flow regulating means, a degree of self-regulation and thus balance between the flow in the two channels can be achieved. Whilst this feature can beneficially be employed in conjunction with the flow restricting means discussed earlier, it may allow for the resistance of the flow restrictions means to be reduced as compared to its value without such self-regulation.

In a set of embodiments offering yet another (not mutually exclusive) way to address flow resistance imbalance between the channels, the apparatus comprises two inlet channels for supplying liquid from the pump to the two heated flow channels, wherein the two inlet channels comprise means for increasing the flow resistance in one inlet channel in response to the pressure in the other inlet channel increasing. Thus it will be appreciated that when the pressure in one of the heated flow channels and therefore its associated inlet channel increases, e.g. as the result of a blockage reducing flow in the heated flow channel, the resistance in the other inlet channel is increased to balance out the pressure between the two inlet channels and so the flow rate through the heated flow channels. Again, although this will lead to an overall reduction in aggregate flow rate through the two heated flow channels, this is preferable to the flow rates in the channels being out of balance. An overall reduction in flow rate can, for example, be compensated by increasing the speed of the pump.

This is considered to be novel and inventive in its own right and therefore from a further aspect the present invention provides an apparatus for heating liquid comprising: two heated flow channels each comprising heating means for heating liquid flowing therethrough and each channel having an inlet and an outlet; a common pump for supplying liquid to the heated flow channels, and two inlet channels for supplying liquid from the pump to the two heated flow channels, wherein the two inlet channels comprise means for increasing the flow resistance in one inlet channel in response to the pressure in the other inlet channel increasing.

It will also be appreciated that the means for increasing the flow resistance in one inlet channel could replace the previously recited means for regulating or restricting the flow, and in this set of embodiments it therefore allows a lower power pump to be used as the resistance provided by the flow regulating or flow restricting means does not have to be overcome, it is simply the variable flow resistance which balances the flow. However the Applicant has realized that it could be advantageous to use flow regulating or flow restricting means in combination with the means for increasing the flow resistance in one inlet channel and a higher pressure pump as this can give a more instantaneous response to any variations in flow through the channels.

The means for altering the resistance in one inlet channel in response to the pressure in the other inlet channel could comprise a mechanical coupling between two separate inlet channels, e.g. a fluid or gel filled region, struts, ribs, or other couplings between flexible or displaceable walls. However, in a preferred set of embodiments the inlet channels share a displaceable common wall for at least part of their length. Therefore when the pressure in one of the inlet channels increases, the common wall is displaced to increase the cross sectional flow area of that inlet channel and reduce the flow area in the other thereby balancing out the pressure between the two inlet channels and so the flow rate through the heated flow channels.

The displaceable common wall could simply comprise a flexible or sprung wall between the two inlet channels. However, in a preferred set of embodiments the common wall comprises a diaphragm in a distribution plenum block. Providing a diaphragm in a distribution plenum block gives a large common area between the two sides thereby giving fine control over the flow balance between the channels. The diaphragm could comprise biasing means to bias the diaphragm to its central position, e.g. a spring either side of the diaphragm, so that the elastic response of the diaphragm can be controlled.

Except where stated otherwise, in accordance with all aspects of the invention the flow heater may be employed to produce boiling liquid—e.g. by heating liquid in the second region to boiling.

Where not explicitly mentioned all aspects of the invention can be advantageously employed in a flow heater comprising a first heating region for heating liquid flowing therethrough to a first temperature below boiling, and a second heating region for heating said liquid further—either to boiling or to a second temperature below boiling, said second region having means for permitting the exit of steam therefrom separately from heated liquid.

In all aspects of the invention the means for permitting the exit of steam therefrom separately from heated liquid is preferably configured to allow steam and heated liquid to exit their respective exit means simultaneously.

There are many possible arrangements for dispensing the heated liquid from the second region in accordance with the invention. One possibility would be a simple valve or tap for allowing water to drain out of the second region/final heating chamber. The problem with such an arrangement is that the outflow through such a valve or tap would have to be precisely coordinated with the inflow from the pump. For example, if the outflow rate is even slightly greater than the inlet flow rate, (or if it commences to flow out too early) the heater will run dry. If the outflow rate is slightly lower, then the outflow chamber will overflow, or, as the water level increases, the effect of micro-boiling in the chamber will result in water spitting. This will occur because, as the steam bubbles generated at the surface now must travel through a vertical body of water, they will entrain droplets of water and carry them at high velocity to the surface. The pump inflow, as discussed can start and stop at irregular times, and, is constantly varying in response to all the input variables—desired outlet temperature, inlet water temperature, voltage fluctuations, and the natural oscillations that can occur in any closed loop control system. The difficulty in controlling the outflow is further exacerbated by the need, on start-up, to prevent outflow until such time as sufficient water has entered to fill the system to its intended working level.

In a set of preferred embodiments therefore means are provided to permit automatic outflow of liquid upon the liquid reaching a predetermined level. This ensures that a certain amount of liquid is retained and can therefore ensure that a heater surface is covered sufficiently to prevent it overheating. Such a function could be achieved electronically or through use of a float but preferably a weir is provided such that liquid escapes over the weir and out of the second region/ final heating chamber when the water level in the region/ chamber exceeds a predetermined height (determined by the height of the weir).

In a set of embodiments a weir is provided in the second region, the height of which varies around its perimeter. This can allow greater control of the outflow rate for a given height of liquid in the second region.

In a set of embodiments an outlet is provided in the second region, the surface area of which increases with the height of liquid in the second region. This too can allow greater control of the outflow rate from the second region. In particular it can be configured to allow the liquid in the second region to maintain adequate coverage of the heating element across a range of inflow rates.

It has been found that the two features outlined above can be achieved using an outlet having a mouth shaped to conform approximately to the shape of a portion of the heating element disposed in the second region—e.g. so that the mouth is an approximately fixed spacing from the element. In another set of embodiments a weir is provided across the outlet, the open surface area of which increases with the height of liquid in the second region.

Preferably the outlet of the second region is arranged to allow liquid to drain therefrom to a level below a portion of the heating element in the second region when the inflow rate is below a predetermined threshold. This ensures that, should flow in the system slow dramatically or cease unexpectedly, the said portion of the element in the second region will overheat and trigger overheat protection before the part of the element in the first region overheats as a result of the low flow rate. In one set of embodiments this is achieved by configuring the surface area of the outlet, or weir across the outlet, to increase with the height of liquid in the second region. The increase in surface area with height could be linear or non-linear.

In all embodiments of the invention the heated or boiling liquid exiting the heating chamber could be dispensed directly into a user's receptacle, e.g. through a spout, or could be conveyed to another part of an appliance for further treatment.

In accordance with various aspects of the invention, steam is allowed to exit from the second region separately from the heated liquid. It could be directed to exit from a part of an appliance away from the user in normal use—e.g. it could be vented to the rear of the appliance. In other embodiments the steam could be captured and condensed in a suitable trap, drip tray or the like. This could be a special drip tray or, more conveniently, a drip tray beneath the spout could be used.

In one set of embodiments the steam outlet is configured to direct steam from the second region into a receptacle placed to receive heated liquid dispensed from the apparatus. This has several benefits. First it enhances safety by avoiding the issuance of steam from another part of the appliance which may be unexpected by a user, whereas the user will be expecting hot fluids to issue from the spout; the steam as well as the water can be captured in the receptacle. Second, the steam may assist in limiting loss of heat from the heated liquid while it is being dispensed, thus delivering the liquid closer to the required temperature. Third, particularly in appliances or modes of operation intended to deliver water close to boiling, the sight of steam in the vicinity of the outlet gives a greater user perception that the water being delivered is boiling.

In a convenient set of the embodiments mentioned above a steam path and a heated liquid path are provided by a coaxial tube arrangement extending into the second region. The mouth of the steam path tube would be disposed at a level in the second region above the expected maximum level of liquid and the mouth of the liquid tube would be below this level. This arrangement thus maintains the important distinct paths for heated liquid and steam/vapor which is the key to minimizing spitting.

In some embodiments of the invention the steam path between the second region/final heating chamber and the atmosphere is sufficiently restricted to give rise to a pressure difference across it in use of between 0.1 and 1 bar, preferably between 0.2 bar and 0.5 bar. By allowing the second region/final heating chamber to become slightly pressurized in use as compared to the atmosphere, the boiling temperature of the water or other liquid is slightly increased which helps to raise the temperature of the liquid actually received in the user's receptacle.

Where reference herein is made to 'steam' this should not be understood as implying that any significant or bulk boiling occurs; rather it is intended to indicate any vapor, damp air or steam proper which might arise.

The orientation of the apparatus, and particularly the first region can be chosen to suit the form of the appliance in which the heater is employed. Conveniently in one set of embodiments the heated flow conduits in the first region are arranged to run horizontally, but in some embodiments the channels or heated flow conduits are arranged to run vertically, e.g. in a coffee maker to save space.

BRIEF DESCRIPTION OF THE DRAWINGS

Certain embodiments of the invention will now be described, by way of example only, with reference to the accompanying drawings in which.

DETAILED DESCRIPTION OF THE INVENTION

Figure 1:
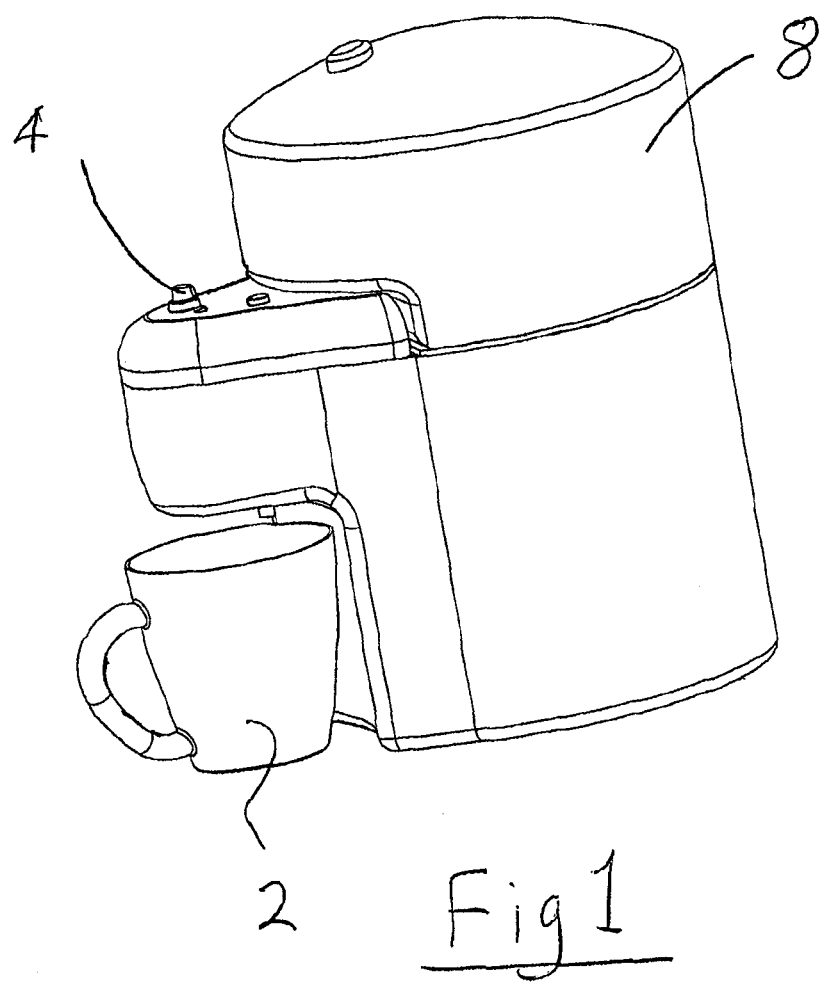
FIG. 1 is a perspective view of a heated water dispensing apparatus embodying the invention.

FIG. 1 shows an embodiment of the invention which can be used to dispense heated water, on demand into a cup 2 for making hot beverages. The temperature of the water can also be adjusted by turning a knob 4. The dispense temperature can be varied, for example, from 65° C. to nearly 100° C. The amount of water to be dispensed is controlled by a second knob (not shown). On the upper part of the main part of the apparatus is a water tank 8 which must be filled periodically by a user.

Figure 2:
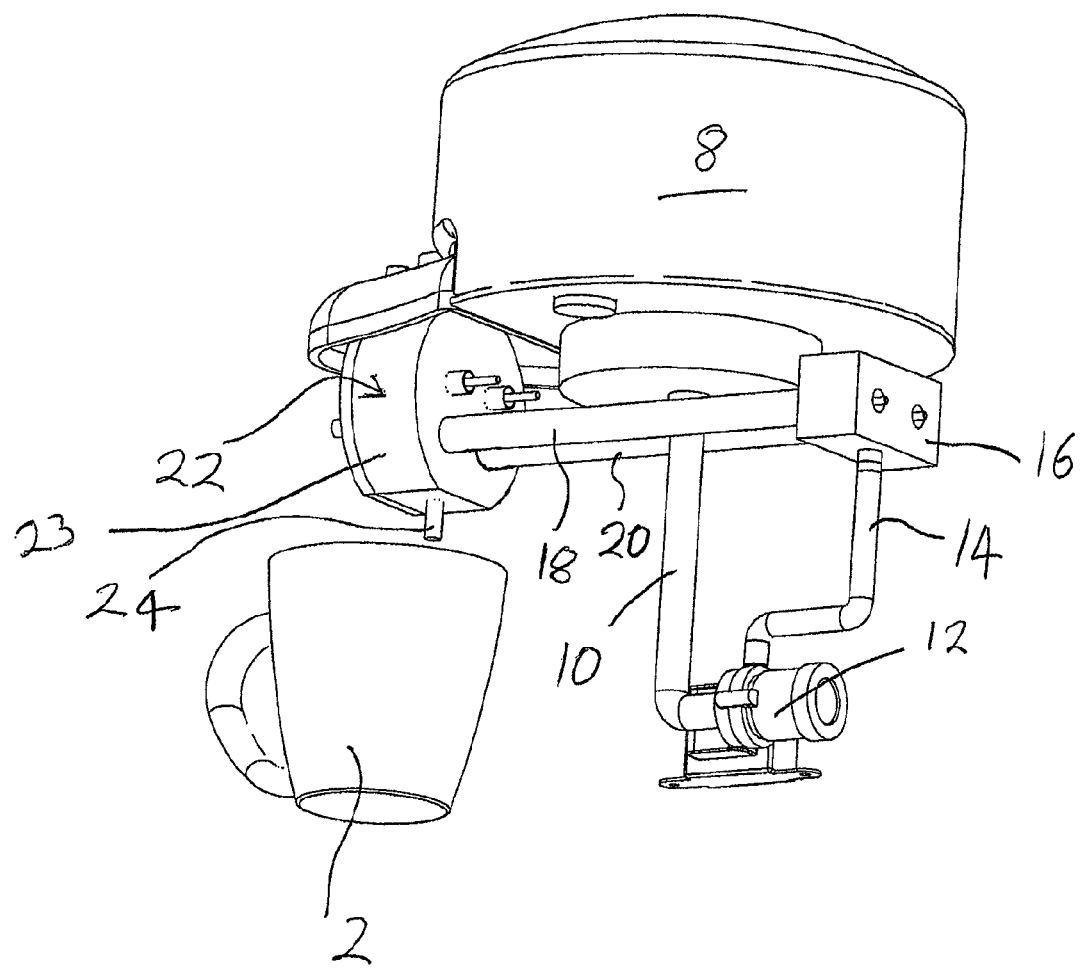
FIG. 2 is a partly cut-away view of the apparatus showing the main components thereof.

FIG. 2 shows some of the main internal components of the apparatus with other parts omitted for clarity. From here may be seen the water tank 8, extending downwardly from which is an outlet pipe 10 connected to the inlet side of a pump 12. The outlet side of the pump 12 is connected via a tube 14 to a water distribution plenum block 16 which distributes water entering the block between two parallel flow heater sections 18, 20 together forming a first heating region, as will be explained in greater detail below with references to FIGS. 4 to 8.

At the downstream end of the flow heater portions 18, 20 is a heating chamber 22 forming a second heating region. This is formed by a deep-drawn stainless steel cup 23 fitted to an approximately circular stainless steel element head 54 (see FIGS. 3, 8, 9, 13 and 14). The heating chamber 22 has an outlet spout 24 projecting downwardly from it for dispensing heated water into the user's cup 2.

Figure 3:
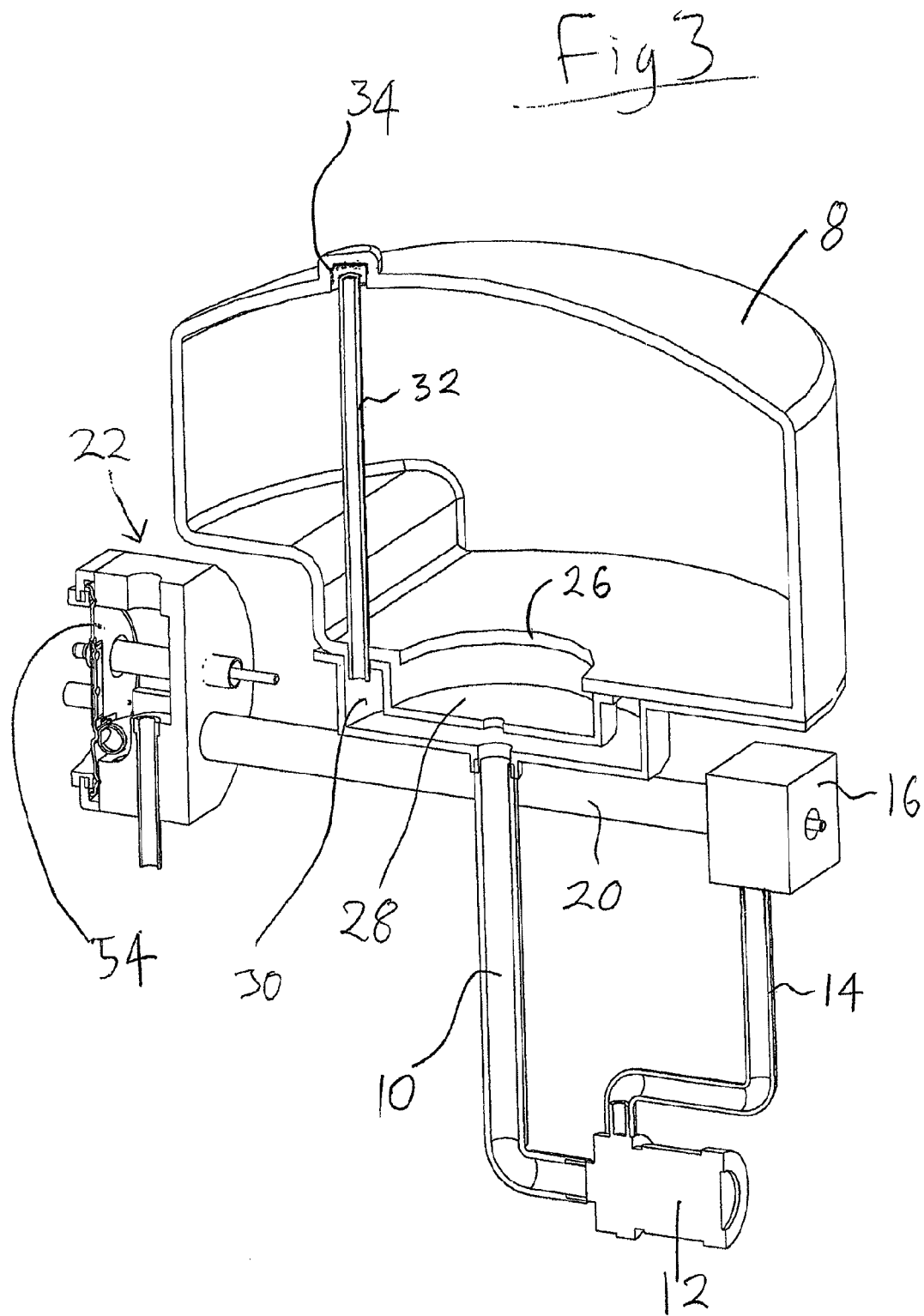
FIG. 3 is a cross-sectional view through the water reservoir and other components.

The cross-section of FIG. 3 shows the interior of the water tank 8. From this it can be seen that the base of the water tank 8 has a circular aperture 26 which is designed to receive a water filter, for example the applicant's Aqua Optima water filter. This is represented very schematically by the component marked with the reference numeral 28. The water filter 28 has a restricted outlet aperture (typically of the order of 4 mm) which has the additional benefit in the present context that it is too small to allow air to pass into the filter when there is water in the filter; were this not the case bubbles of air could get into the filter and reservoir so allowing the continuous flow of water. The lower part of the water filter 28 is received inside a further, intermediate holding chamber 30, in the center of which is an outlet connected to the pipe 10 which connects it to the pump 12.

A vertical tube 32 extends from the upper part of the holding chamber 30 into the main water tank 8 and terminates just inside an indented portion 34 of the top of the water tank 8. This allows pressure equalization between the holding chamber 30 and the water tank 8.

Figure 4:
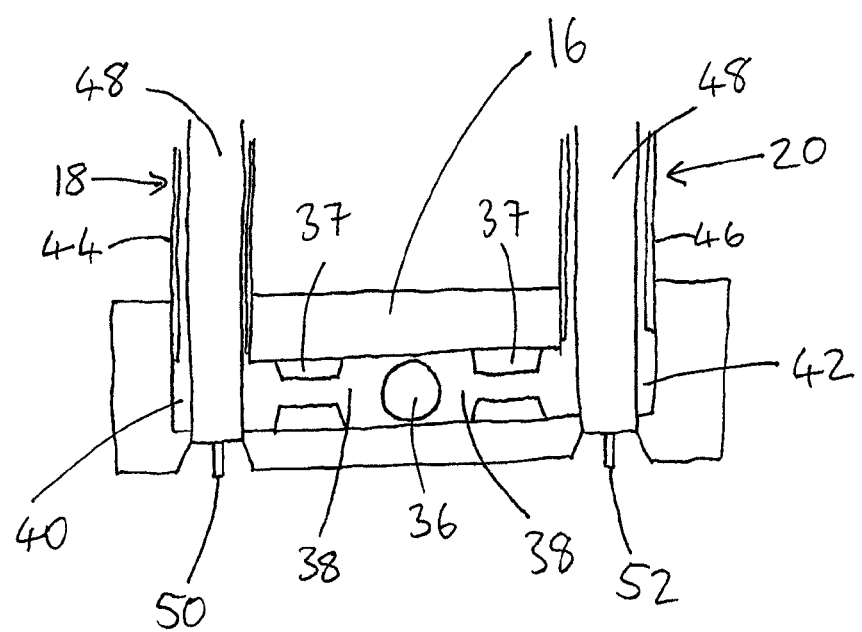
FIG. 4 is a horizontal cross-section through the water inlet distribution block and flow heater pipes.

FIG. 4 shows a schematic of a horizontal cross section through the distribution plenum block 16 and the two parallel flow heaters 18, 20. The outlet side of the pump connects via a tube (not shown here) to a vertical inlet channel 36 in the distribution block 16. This connects within the block to two laterally extending tubes 38 which open out into corresponding larger bore circular section cylindrical chambers 40, 42 at right angles to the lateral tubes 38. Disposed within each of the lateral tubes 38 is a ferrule 37 which has an external diameter equal to the internal diameter of the corresponding lateral tube 38 so as to form a tight interference fit. The internal diameters of the ferrules 37 are clearly narrower than the tubes 38 and so represent an intentional additional flow resistance. The inlet ends of the ferrules 37 may be flared. Because the ferrules 37 are separate components inserted during manufacture, it is possible to use ferrules having slightly differing flow resistances on either side in order to compensate for any inherent differences in flow resistance of the two flow heater tubes 18, 20 which may have arisen during manufacture. The is most conveniently achieved by trimming the lengths of the individual ferrules to give the required flow resistance.

The cylindrical chambers 40, 42 receive the ends of the two flow heater sections 18, 20 respectively. As can now be seen, each of the flow heater sections 18, 20 comprises an outer jacket 44, 46 and a length of a sheathed immersion-type heating element 48 which, although not depicted, comprises a stainless steel casing and a coiled resistance wire packed in magnesium oxide insulating powder. The cold tails 50, 52 of the immersed element emerge through holes provided in the rear of the distribution plenum block 16.

The two flow heater sleeves 44, 46 are wider in diameter than the corresponding heating element 48 and so define therebetween a corresponding annular channel for each of the flow heater sections 18, 20. As may be seen from this cross-section, the sleeves 44, 46 make a sealing connection with the front end of the circular channels 40, 42 in the block 16 but stop short in those channels of the point where they meet the lateral channels 38 so that the aforementioned annular channel in each of the flow heaters 18, 20 is open to the cylindrical chambers 40, 42 formed within the distribution block 16 whilst the sheathed element 48 extends through the block and is sealed against it. The result of this is that there is a fluid path from the block inlet 36, via the lateral channels 38, the ferrules 37 and the cylindrical chambers 40, 42 to the interior annular channels of the two flow heaters 18, 20.

Figure 5:
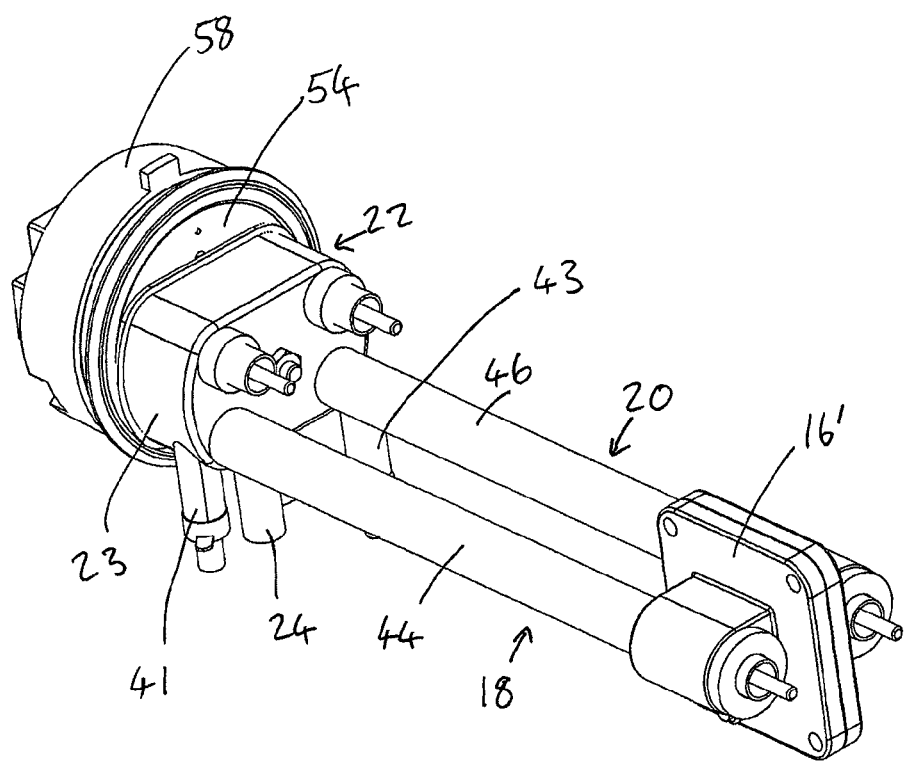
FIGS. 5 and 6 are perspective views of the flow heaters, heating chamber, control unit and a modified water distribution block.
Figure 6:
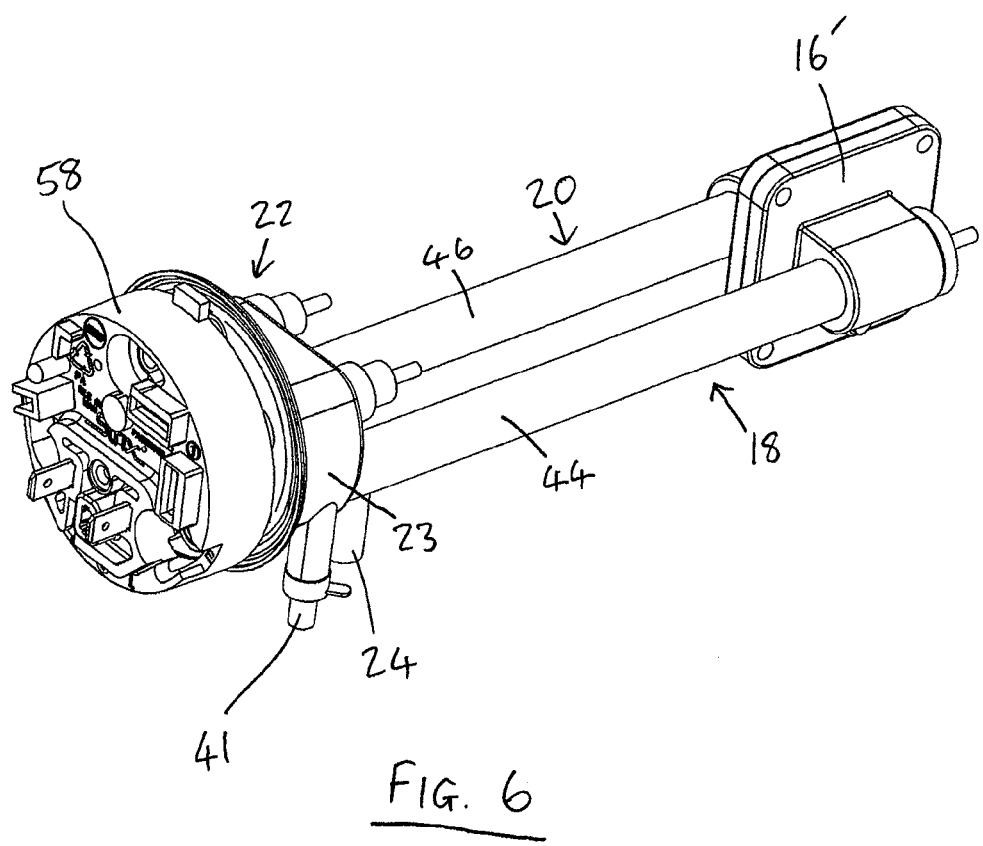

FIGS. 5 and 6 show two different views of a slightly modified embodiment from that shown in FIGS. 1 to 4, for which the majority of the components are the same. The main difference is that a differently shaped distribution plenum block 16' which is provided between the inlet ends of the flow heaters 18, 20. In addition to the features shown in FIGS. 1 to 4, a tube 41 extends from the lower surface of the heating chamber 22 adjacent to the outlet from one of the flow heaters 18. Another tube 43 extends from the underside of the other flow heater 20 just before its outlet into the heating chamber 22. Accommodated within each of these two tubes 41, 43 is a thermistor (shown in FIGS. 8 and 9) which is positioned to sense the temperature of the water at the respective point of the flow heaters 18, 20. Also shown is a standard immersed element control unit 58 which is fixed to the other side of an immersed element head plate 54 from the heating chamber 22.

Figure 7:
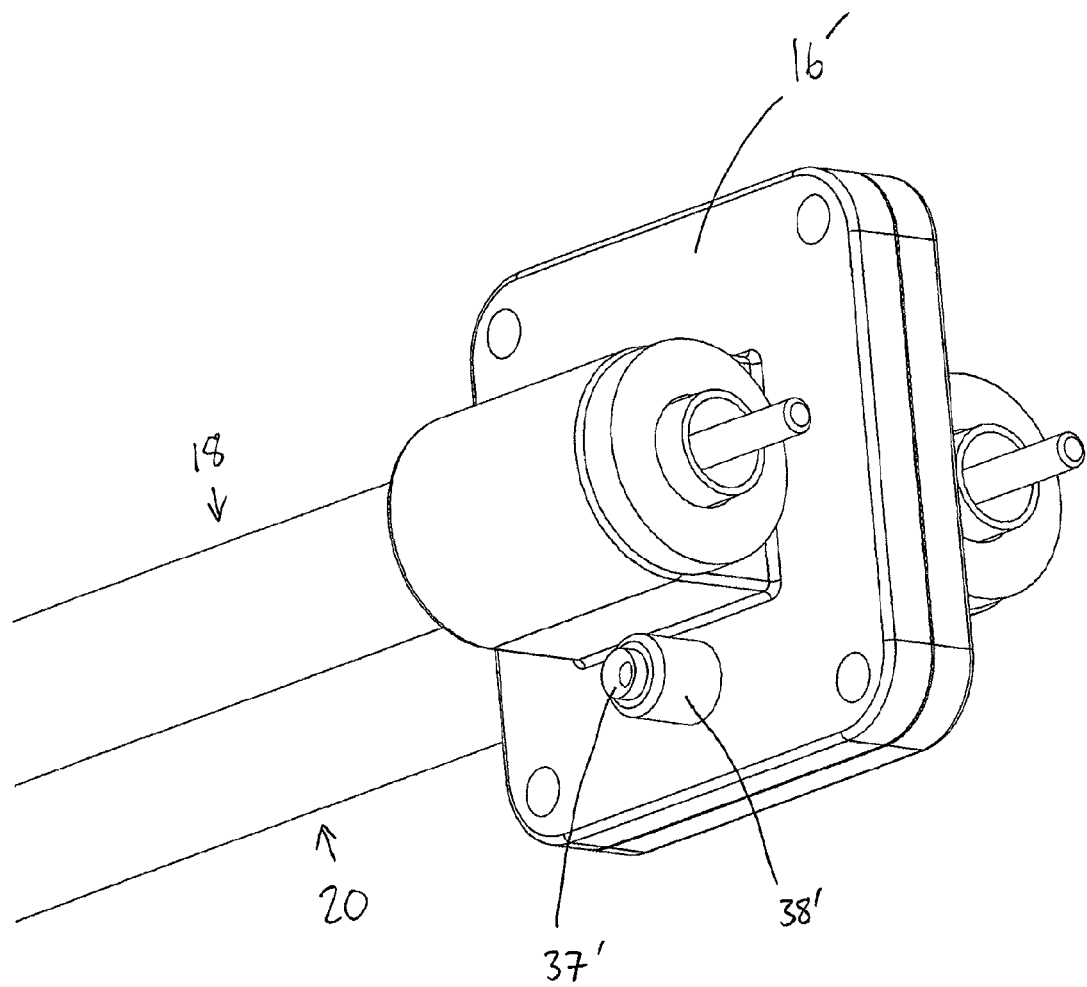
FIG. 7 is a close-up view of the modified water distribution block.

FIG. 7 shows a close-up view of the distribution plenum block 16' which includes a different arrangement for the lateral tubes 38' and the ferrules 37' to that shown in FIG. 4. The lateral tubes 38', in which the ferrules 37' are disposed, project outwards from the surface of the distribution plenum block 16' on either side of it. A pipe (not shown) connects onto each of the lateral tubes 38' to provide fluid connection to the outlet tube 14 from the pump 12.

Figure 8:
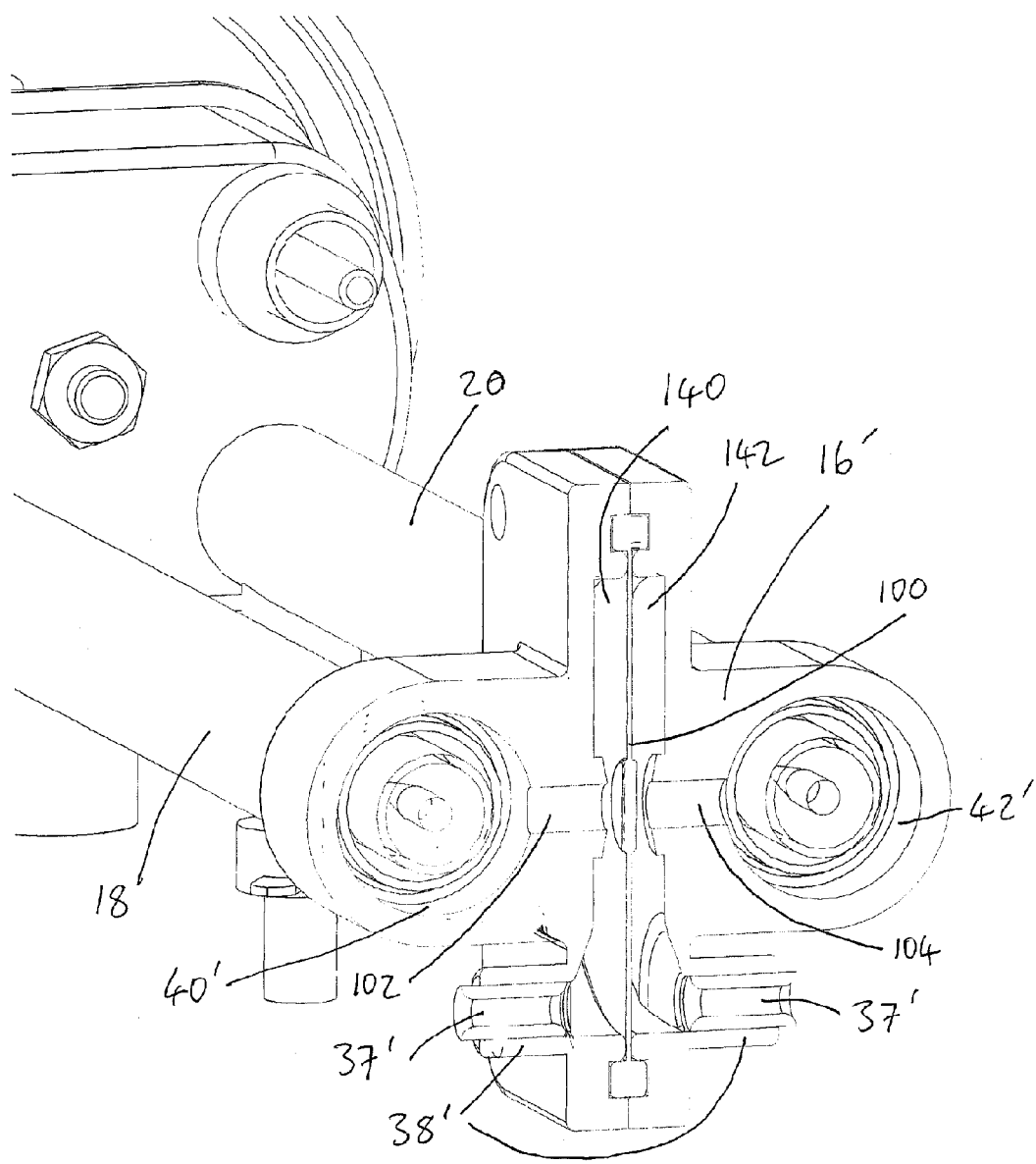
FIG. 8 is a vertical section showing the interior of the modified water distribution block of FIG. 7.

FIG. 8 shows a vertical cross section through the distribution plenum block of FIG. 7. Inside the distribution plenum bock 16' the lateral tubes 38' and their ferrules 37' lead into the bottom of two circular section cylindrical chambers 140, 142 which are separated by a diaphragm 100. The diaphragm, made from a flexible material such as silicone rubber, comprises a rib at its circumference which is clamped between the two halves of the distribution plenum block 16' such that it is stretched taught to create the two separate inlet chambers 140, 142.

Each of the cylindrical chambers 140, 142 connects within the distribution plenum block 16' via two other lateral tubes 102, 104, to two other circular section cylindrical chambers 40', 42' at right angles to the lateral tubes 102, 104. The cylindrical chambers 40', 42' receive the ends of the two flow heater sections 18, 20 respectively. The result of this is that there is a fluid path from the inlet lateral tubes 38', the ferrules 37', via the cylindrical chambers 140, 142, the other lateral tubes 102, 104 and the other cylindrical chambers 40', 42' to the interior annular channels of the two flow heaters 18, 20. The diaphragm also comprises a widened central portion opposite the two lateral tubes 102, 104 which lead out of the distribution plenum block 16', which, in the event of a large increase in pressure in one of the two circular section cylindrical chambers 140, 142 in distribution plenum block 16', e.g. owing to a complete blockage in one of the two flow heaters 18, 20, will act to seal the mouth of the lateral tube 102, 104 leading out of the other cylindrical chamber 140, 142. This is aided by the mouth of the lateral tubes 102, 104 projecting slightly from the edge of the cylindrical chambers 140, 142.

Figure 9:
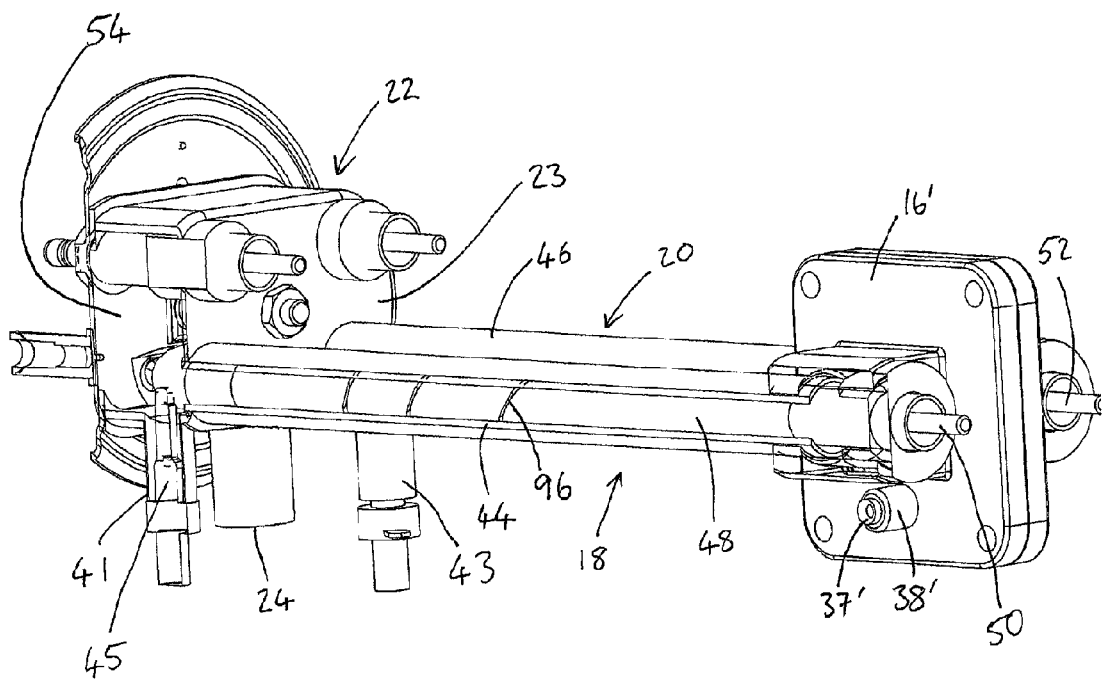
FIG. 9 is a vertical section showing the interior of one of the flow heaters.

FIG. 9 shows the full length of the flow heaters 18, 20. From here it can be seen that the respective outer sleeves 44, 46 thereof are sealed at the other end to the heating chamber 22. The heating element 48 extends into the heating chamber 22 and is bent round to form two elongate arms which respectively foam part of the two flow heaters 18, 20. This is seen more clearly in FIGS. 11 and 13. Also shown in FIG. 9 is the tube 41 extending from the lower surface of the heating chamber 22 adjacent to the outlet from one of the flow heaters 18 which houses a thermistor 45. The thermistor 45 projects into the heating chamber 22 a small distance above its base.

Figure 10:
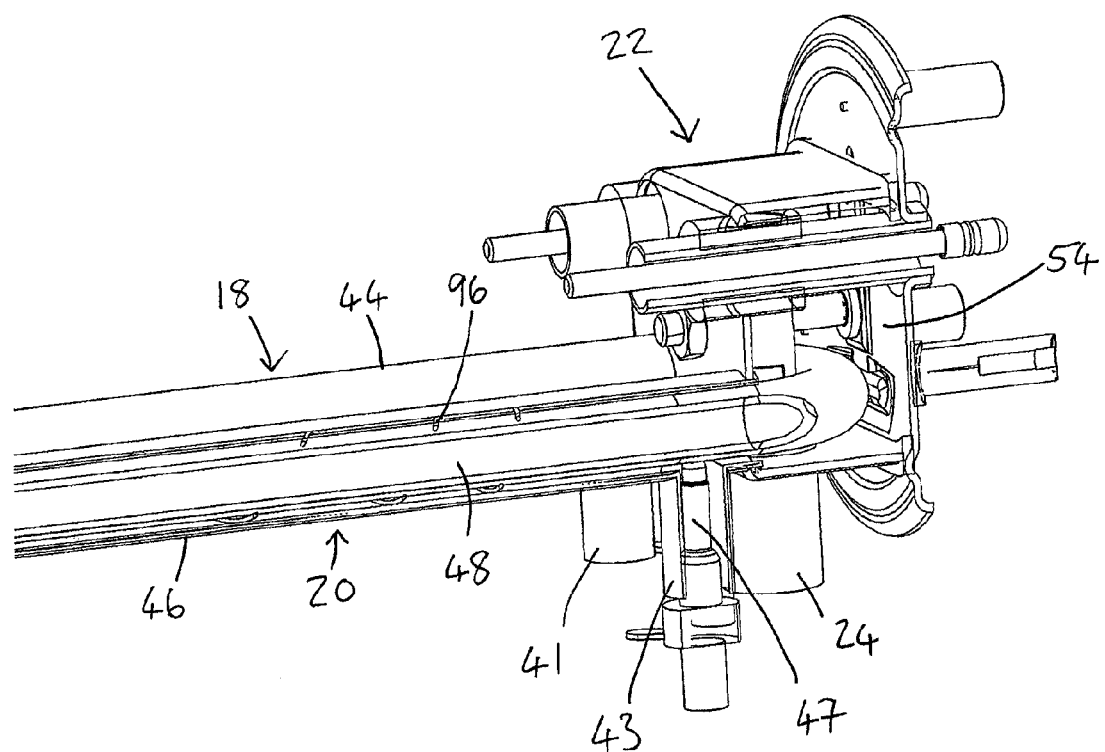
FIG. 10 is a vertical section showing the interior of the other flow heater.

FIG. 10 shows a similar view to FIG. 9 but from the opposite side of the flow heaters 18, 20. This shows the other tube 43 extending from the underside of the other flow heater 20 just before its outlet into the heating chamber 22 in which a thermistor 47 is housed. The tip of the thermistor 47 sits level with the jacket 46 of the flow heater 20.

Figure 11:
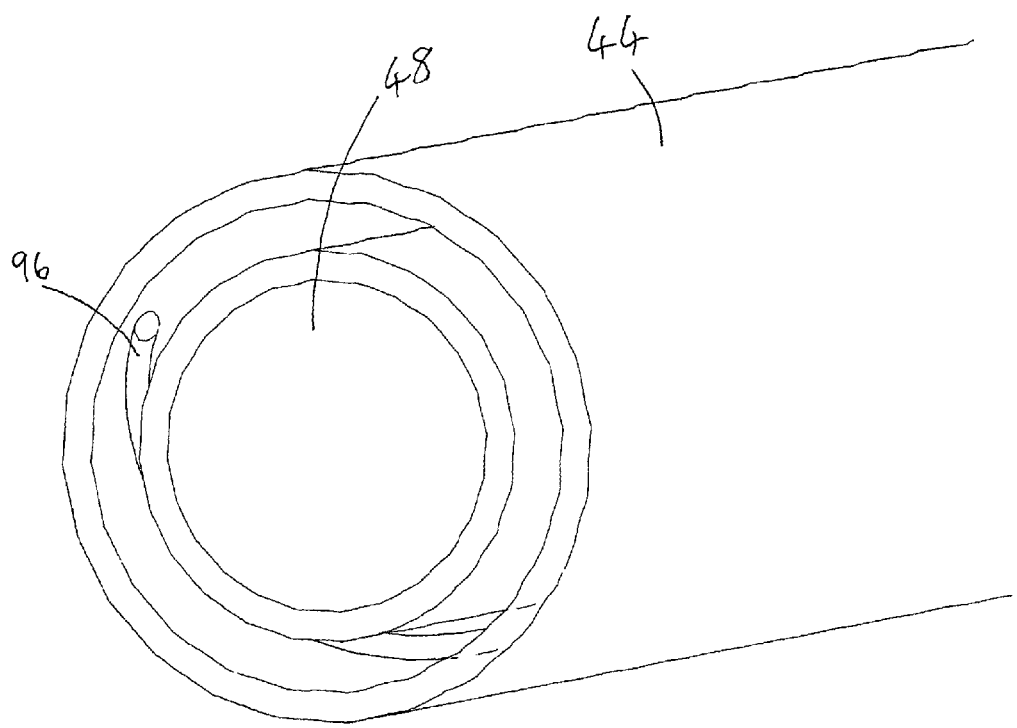
FIG. 11 is a dramatically enlarged cross-section through the heating tube.

Shown in FIGS. 9 and 10, as well as in an enlarged isolated view in FIG. 11 (and again in FIGS. 12 to 14) is a wire 96 which is wrapped around each of the two arms of the sheathed heating element 48 in a helical fashion. The wire 96 is designed to encourage swirling of the water inside the annular channels of the flow heater, and starts its helical winding about half way along each arm of the sheathed heating element 48 from the cold tails 50, 52. The turns of the wire 96 start with a shallow gradient with respect to the axis of the sheathed heating element and increase in gradient such that the distance between the turns of the wire 96 decreases with each turn. The helical winding of the wire 96 continues for three turns, which have a distance between them of approximately 3×d, 2×d and d respectively where d is the diameter of the flow heater sleeves 44, 46. The helical winding finishes at a distance of approximately 3×d from the outlet of the flow heaters 18, 20.

The helical winding of the wire 96 is carried out during manufacture prior to insertion of the arms of the element 48 into the respective sleeves 44, 46 (see e.g. FIGS. 9 and 10) to form the annular channels along which the water flows in use. The wire 96 is conveniently made from stainless steel having a diameter of for example 0.4 mm, although the material, dimensions and pitch of the wire may be chosen to suit the particular application. It will be noted from FIG. 11, however, that in this particular embodiment at least, the wire 96 which is wrapped around the element 48 is wide enough very nearly to fill the annular channel formed between the element 48 and the outer sleeve 44 completely. In use the presence of the wire 96 has been found to encourage a swirling motion of water inside the respective channels which, as was explained above, gives a more even circumferential temperature distribution and so facilitates temperature measurements. The decreasing distance between the turns of the helical wire 96 is such that the gradient of the wire 96 with respect to the axis of the heating element 48 is not too great to cause a disruptive influence on the flow of water, but by the time the gradient increases at the end of the wire 96, this creates the necessarily fast swirling motion of the water to adequately mix it to enable a reliable temperature measurement downstream of the wire. The wire 96 stops short of the end of the flow heaters 48 which allows the water to freely mix by the time it reaches the temperatures sensors 45, 47 with out the sensed temperature being influenced by flow artefacts caused by the wire.

The two helical wires 96 are spot-welded to the element tube 48 at their respective downstream ends so that the remainder of the coils are free to move longitudinally with respect to the element 48. In use this provides a degree of self-regulation in the flow resistance of the tubes which is dependent on the transverse cross-sectional area of the helical path which the water is made to follow by the spring 96. It will be appreciated that this cross-sectional area is dependent on the height of the overall annular space formed between the element 48 and the jackets 44, 46; and by the distance between adjacent turns of the wire coil 96. If a partial blockage should arise in one of the flow heater sections 18, the flow rate in the other 20, will rise as it represents an easier path out of the plenum 16. However this will tend to compress the spring coil 96 in the second channel 20, thereby increasing its flow resistance until equilibrium between the two channels 18, 20 is restored. This comes at the price of reducing the aggregate flow rate through the apparatus but this is preferable to the flow rates in the two channels being unbalanced. The aggregate reductions can, within a certain range, be increased by increasing the pump speed.

Figure 12:
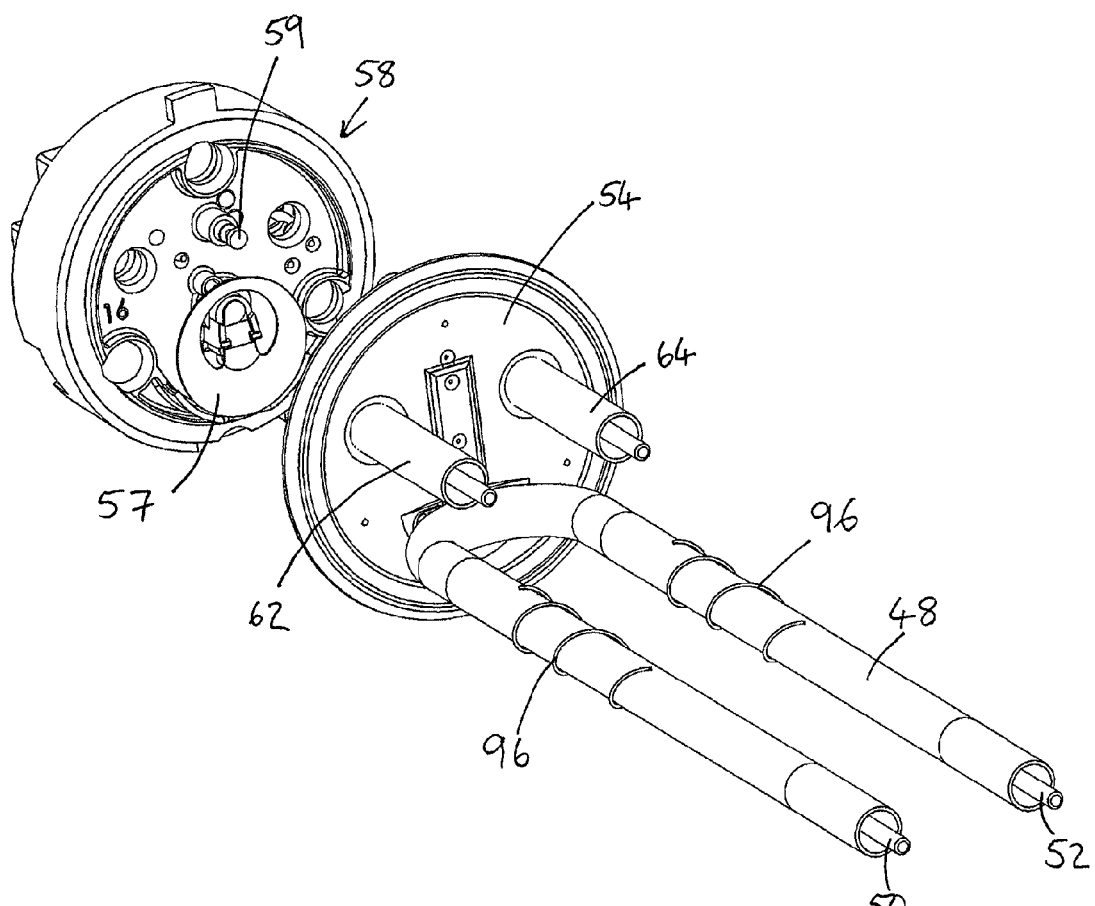
FIG. 12 is an exploded view of the element head and control unit from the front.
Figure 13:
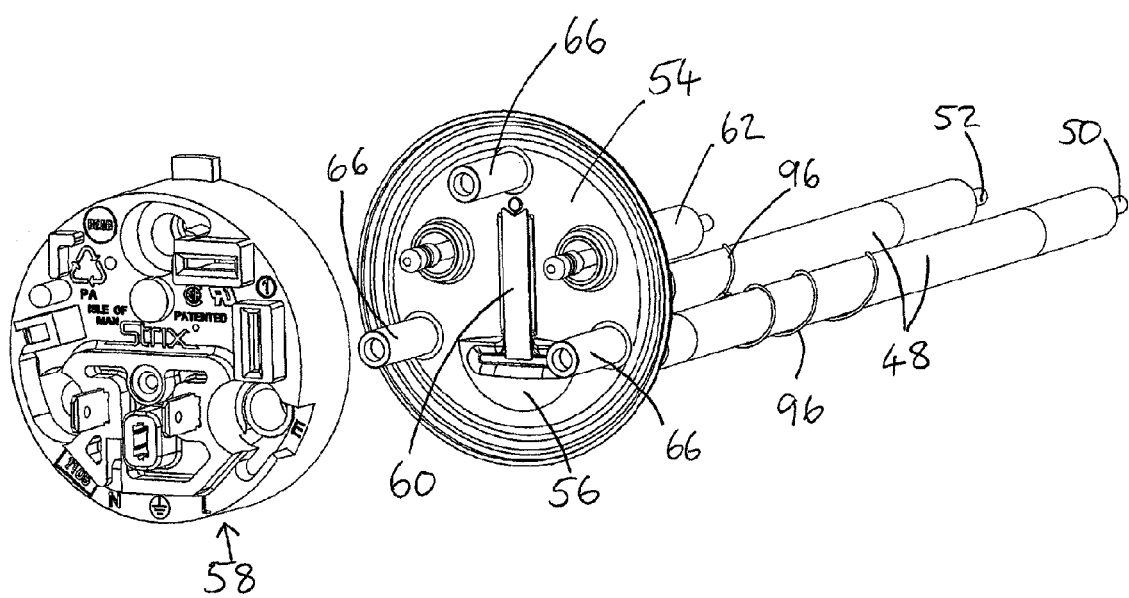
FIG. 13 is an exploded view of the element head and control unit from the rear.

As can be seen from FIGS. 9, 10 and 12, the bent portion of the element 48 is brazed to an immersed element head plate 54 which closely resembles the element head plates seen in traditional immersed element kettles. This arrangement is known as a hot return and, as can be seen from FIG. 13, the other side of the head plate 54 is formed with a semi-circular indentation 56 to receive the snap-acting bimetallic actuator 57 of a standard immersed element control unit 58. FIG. 13 also shows a copper strip 60 extending from the hot return against which bears a nylon thermal fuse 59 (shown in FIG. 12) of the control unit 58 for providing secondary level overheat protection. Alternatively in nickel-plated copper immersed element heads, no copper strip is required as is also well known in the art.

It will be appreciated by those skilled in the art looking at FIGS. 12 and 13 that the cold tails of the element 50, 52 do not project through the element head 54 as would be conventional for an immersed kettle element, but rather they project through the distribution plenum block 16 (omitted for clarity in FIGS. 12 and 13). Instead, two dummy cold tail components 62, 64 project through the element head 54 to make electrical contact with the control unit 58 and are in turn connected by means of flying leads (not shown) to the cold tails proper 50, 52. This allows a standard production control unit 58 to be employed without modification, which is a substantial cost saving as against having to design and produce a new dedicated control unit. The element head is provided with three mounting studs 66 for the control unit 58.

Figure 14:
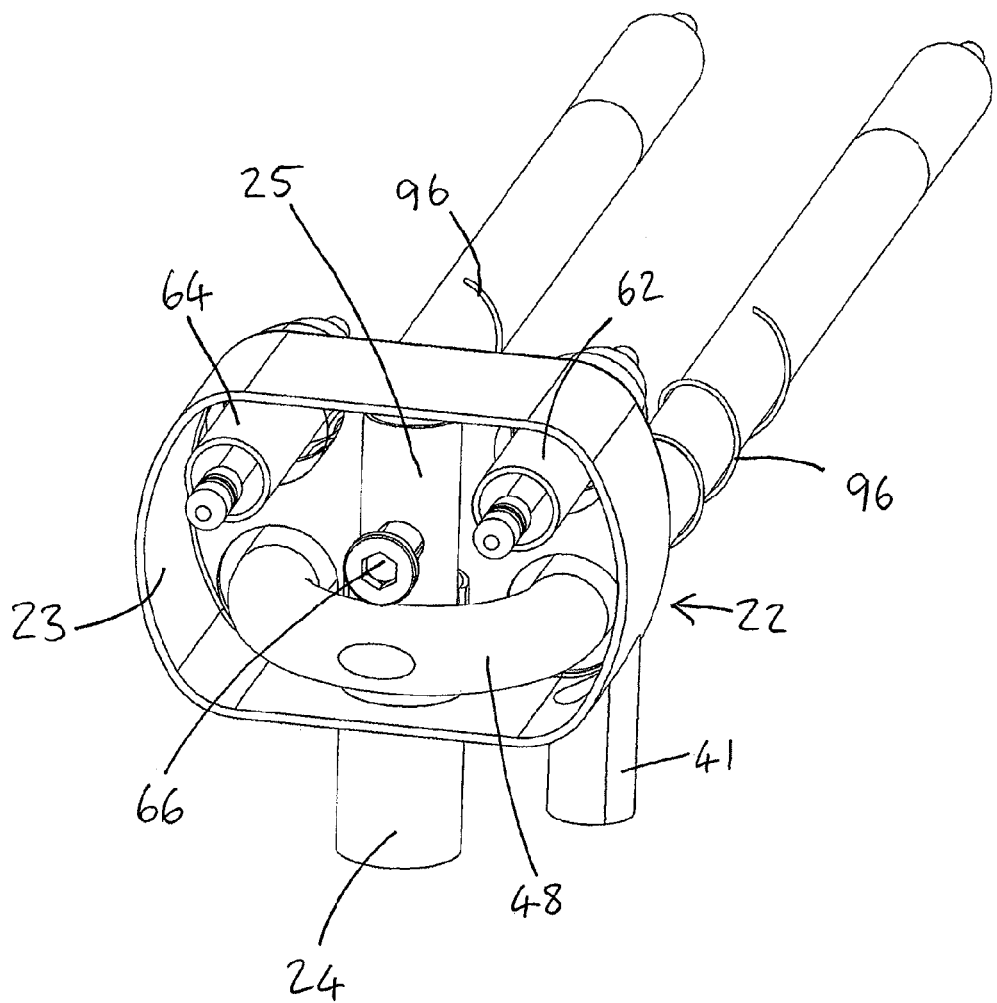
FIG. 14 is a view of the heating chamber with the element head removed for clarity.
Figure 15:
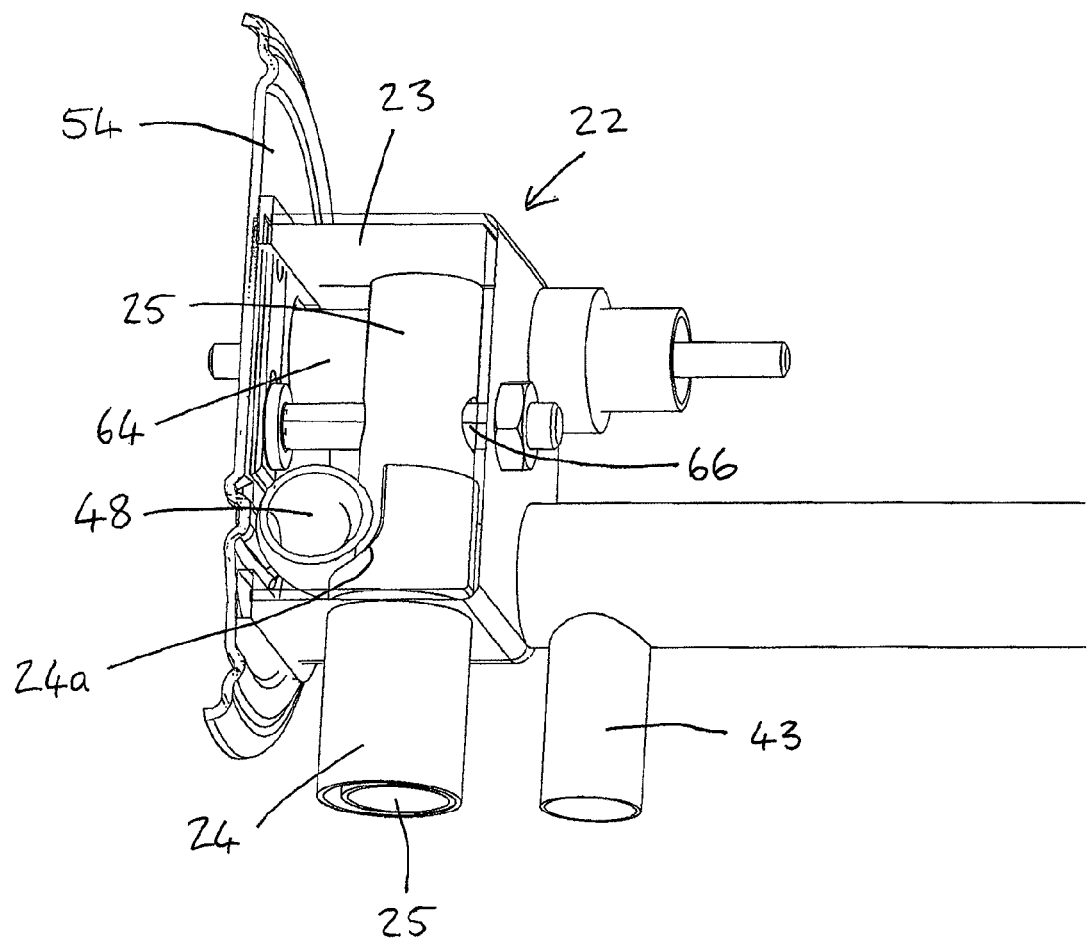
FIG. 15 is a vertical section showing the interior of the heating chamber.
Figure 16:
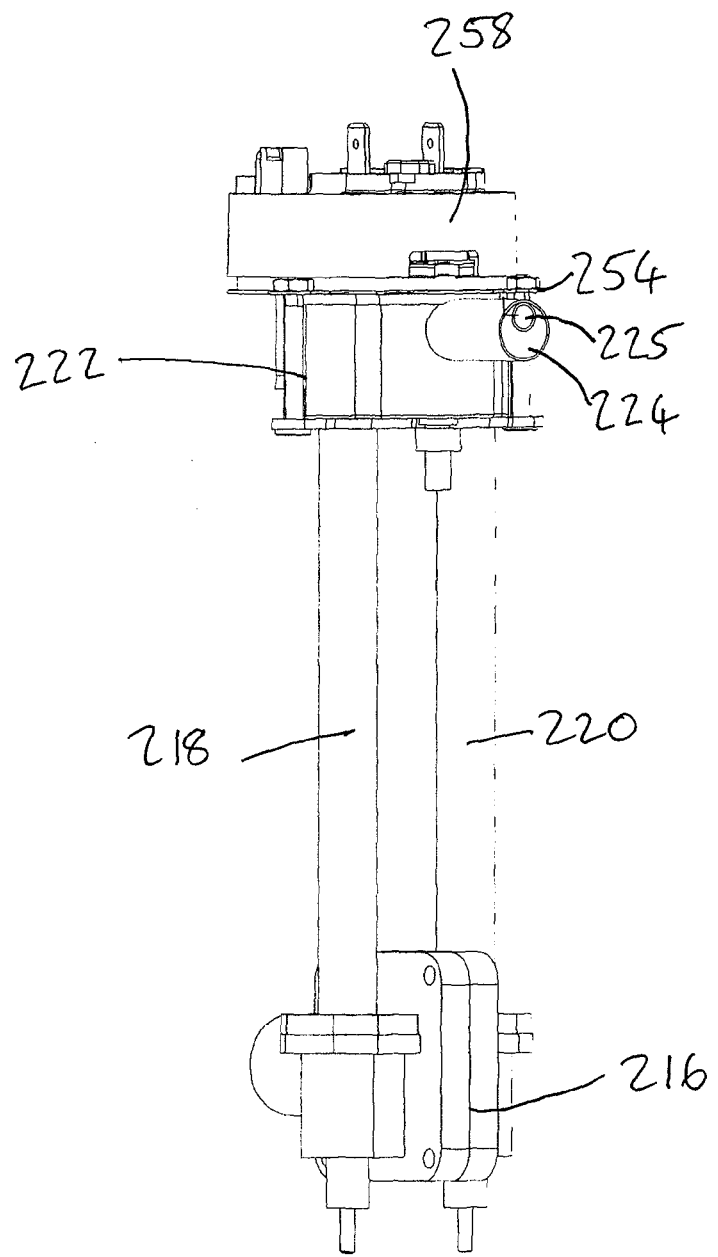
FIGS. 16 and 17 are perspective views of the flow heaters, heating chamber, control unit and a water distribution block of another embodiment.
Figure 17:
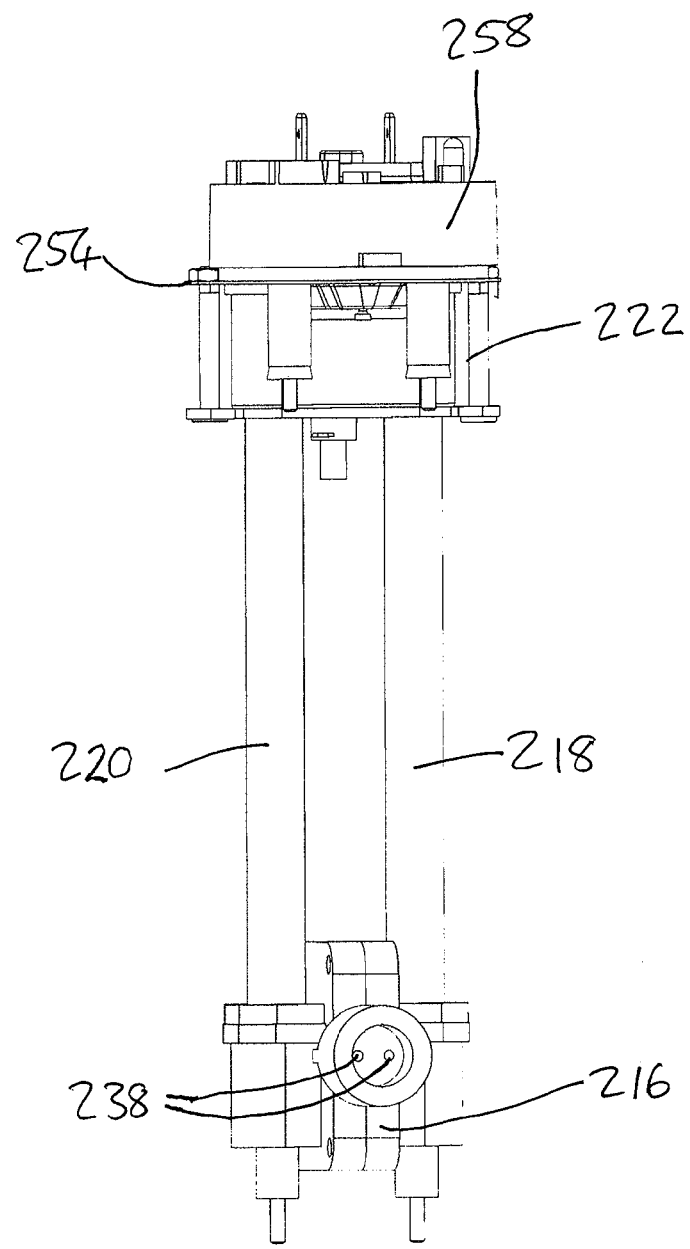

The interior of the heating chamber 22 is best seen from the view of FIG. 14 (which has the element head 54 removed) and FIG. 15. From here it can be seen that the chamber 22 formed by the stainless steel cup 23 is broadly of a squat cylindrical shape although its internal volume is limited by the two dummy cold tails 62, 64, the bent portion of the heating element 48 and by a steam tube 25 which extends almost to the top of the heating chamber 22 and exits coaxially through the outlet spout 24. The steam tube forms an outlet for steam and vapor from the chamber 22 separate from the outlet path for heated liquid.

A bolt 66 also passes through the heating chamber 22 (and the steam tube 25) to affix the stainless steel cup 23 onto the element head 54.

The top of the outlet tube 24a is not flat but is scalloped to accommodate the bent portion of the heating element 48. As well as having the steam tube 25 passing through the middle of the outlet tube 24, this restricts the flow of water out of the outlet tube 24, thus ensuring that the heating element 48 remains adequately covered in water, so preventing overheating in normal use. The scalloped shape at the top of the outlet tube 24a also prevents water emerging from the channels of the flow heaters 18, 20 from flowing directly into the outlet tube 24, thereby ensuring it is properly heated to the desired temperature. A third function of the shape of the top of the outlet tube 24 is that, by having its minimum towards the bottom of the heating chamber, below the level of the heating element 48, the chamber 22 drains quickly if the water flow from the flow heaters 18, 20 is suddenly reduced or stopped—owing, for example, to a blockage in the flow heaters 18, 20. This causes the exposed part of the heating element 48 in the heating chamber 22 to overheat which can quickly be sensed via the hot return, though the minimum level of the top of the outlet tube 24 is still high enough for some water to remain in the bottom of the heating chamber 22 to provide a reliable temperature measurement from the thermistors 45, 47. The diameters of the steam tube 25 and the outlet tube 24 are chosen such that the heating chamber 22 becomes slightly pressurized (e.g. to about 1 bar) during operation. This acts to pressurize the water output from the heating chamber if, for example, the heater is being used in an apparatus such as a drip coffee machine.

Operation of the apparatus will now be described. First the user fills the water tank 8 with water by removing it, inverting it, removing the water filter 28 and filling from a tap. The filter 28 is then replaced, the tank re-inverted and then placed back on to the apparatus. The water immediately starts to be passed through the water filter 28 inside it at a rate determined by the restricted outlet from the water filter as is known. As water passes through the filter 28 it begins to fill the connecting pipe 10 and then the lower holding chamber 30, displacing air through the ventilation tube 32 into the sealed head-space of the water tank 8. When the water level in the holding chamber 30 reaches the bottom of the ventilation tube 32, air can no longer be expelled from the chamber and so the flow of water stops.

When the user wishes to dispense water he/she sets the required temperature on the first knob 4 and then turns the second knob (not shown) round from an 'off' position to the required volume. Initially the controlling circuit (not shown) activates the heating element 48. After a delay of one or two seconds (depending on the temperature of the water already in the heater) the pump 12 is operated to pump water from the lower chamber 30 through the pipes 10 and 14 into the distribution plenum block 16, 16'. In other embodiments the pump may be started before the heater.

As water passes through the channels 38 in the plenum block, the flow is balanced between the left and right channel. The bore of ferrules 37, 37' in these channels 38 is chosen so that the pressure drop across the ferrules 37, 37' is much greater than for all the rest of the hydraulic system. This is very important in maintaining correct flow through the downstream annular channels 18, 20. For example, if a minor restriction arises in one channel 18, 20 but not the other, there is little effect on the flow rate, as the dominant pressure drop is through the ferrules 37, 37'. A pressure drop ratio of say 10:1 gives the required effect. For example if the pressure drop across the tubular heaters 18, 20 is equivalent to a 100 mm head of water, the pressure drop across the plenum channels 38 would be equivalent to a 1000 mm head. In the embodiment shown in FIGS. 5 to 15, further balancing of the flow is regulated by the diaphragm 100 which is displaced from the center of the distribution plenum block 16'. Displacement of the diaphragm 100 acts to reduce the cross sectional flow area through one side of the distribution plenum block 16', while increasing the cross sectional flow area through the other side, thereby increasing the flow rate on the side in which the flow rate has decreased, e.g. owing to a blockage, and balancing it by a decrease in the flow rate on the other side.

Once water has been pumped into the distribution block 16, 16', it is pumped through this and down the annular channels of each of the two flow heaters 18, between the heating element 48 and the corresponding stainless steel outer jacket 44, 46. This heats the water rapidly as it passes through from ambient temperature (of the order of 20° C.) in the distribution block 16, 16' to between 50° C. and 80° C. at the downstream ends of the flow heaters 18, 20, depending on the desired temperature of the water at the outlet tube 24, which can be selected to be between 65° C. and nearly 100° C. The wire 96 arranged in a helical fashion in each of the flow heaters 18, 20 acts to swirl the water as it passes along the annular channels. The wire 96 stops short of the end of the annular channels allowing the swirling water to mix well before its temperature is measured in the vicinity of the ends of the flow heaters 18, 20, as it has been found that the presence of the wire can introduce spatial deviations in temperature as discussed above.

The temperature of the water is monitored by the thermistors 45, 47 projecting into the tubes 41, 43 in the side of one of the flow heaters 18 near the heating chamber 22 and into the heating chamber 22 at the outlet to the other flow heater 20 respectively. The temperature can be monitored accurately and reliably here since the water is not boiling and therefore there is no significant amount of steam bubbles within it, and also because the helical wire 96 is no longer present which allows the swirling water to mix and equalize any temperature differences. Having the two thermistors 45, 47 at slightly different points on either of the flow heaters 18, 20 gives two independent measurements of the temperature of the water allowing a more accurate determination of what the final outlet water temperature is predicted to be. Any changes in the measured temperature can be used by the control circuit to alter the speed of the pump 12 in order to correspondingly create a relatively constant temperature of water output from the flow heaters 18, 20, i.e. the pump speed is increased to decrease the temperature of the water and vice versa.

The water then passes out of the flow heaters 18, 20 and into the interior of the heating chamber 22 where it begins to fill this chamber, thereby covering (during normal operating conditions) the curved portion of the element 48 which projects into the heating chamber 22. The curved part of the heating element 48 continues to heat the water in the heating chamber 22. Any steam produced from micro-boiling during heating of the water in the heating chamber 22 can easily escape by means of the steam tube 25 which opens at the top of it. The steam passes through the steam tube and to a convenient outlet, though as it runs coaxially through the water outlet tube 24 it advantageously helps to keep the heated water warm as it passes from the heating chamber 22 into the user's cup 2.

Referring particularly to FIGS. 14 and 15, it can be seen that as the water level in the heating chamber 22 rises level with and above the lowest part of the top of the outlet tube 24, it will start to pour out through the aperture and through the outlet tube 24 and into the user's cup 2. The pumped flow rate and the power of the element 48 are matched such that by the time the water leaves the heating chamber through the aperture and outlet tube 24 it is at the required temperature. The height and scalloped shape of the top of the outlet tube 24a is chosen to ensure that the element 48 remains covered in water during normal flow rate but quickly drains the heating chamber 22 if the flow rate drops in order to quickly trigger the snap-acting bimetallic actuator 57.

Heated water continues to be dispensed until the volume set by the user has been dispensed. At which point the pump 12 is switched off. To increase the energy efficiency of the device, the heating element 48 is turned off about 2 seconds before the pump is turned off. There is sufficient stored energy in the element and other components to ensure that the water continues to be heated.

If the water tank 8 should run dry, the heating element 48 will begin to overheat. However, this can be sensed by the temperature sensors 45, 47 projecting through the tubes 41, 43 into one of the flow heaters 18 and into the heating chamber 22, just by the outlet to the other flow heater 20, respectively. As a backup the bimetallic actuator on the control unit 58 will sense overheating of the element 48 and therefore snap into its reverse curvature thereby opening a set of contacts in the control unit in the well-known manner. Secondary backup protection is provided by the thermal fuse 59 of the control unit 58, again as is very well known in the art. The heating element 48 is arranged to ensure that in the case of dry boil or dry switch-on, the hot return portion brazed to the head 54 is the first to become dry. This is achieved by ensuring that the flow in the dual tubes 18, 20 of the first heater is balanced under all adverse conditions (as explained earlier) and also by ensuring that the hot return is slightly higher than the rest of the element 48 by having it and the surrounding tubes 18, 20 slightly inclined. This has a further benefit, on start-up from dry, of ensuring that the tubes 18, 20 are free venting, and that the flowing water can easily push the initial volume of air ahead of it and out into the boil chamber 22 without airlock.

Should the user wish to dispense water at a different temperature, he or she can use the knob 4 at the top of the appliance to set the required temperature which will cause the pump 12 to operate at a higher or lower speed (depending on whether a lower or higher temperature respective has been selected) and therefore give a higher or lower flow rate of water respectively through the apparatus which will mean that it is heated to a lower or higher temperature respectively before it is dispensed. The temperature sensors 45, 47 projecting into the tubes 41, 43 allow the temperature of the water being dispensed through the outlet spout 24 to be predicted from a knowledge of the proportion of the heating element 48 which is upstream of it and the corresponding proportion of the heating element 48 which is downstream of it—i.e. the curved portion in the heating chamber. The sensors can also be used to introduce a relative delay between operating the pump and switching on the element 48 depending upon the ambient temperature of the water sitting in the apparatus (e.g. as a result of previous operation) taking into account the temperature of water requested by the user.

Thus it will be seen that the embodiment described above provides the benefit of a flow heater, i.e. being able to dispense a controllable volume of water on demand, but with the significant advantage of being able to easily sense overheating of the heating element 48 via the hot return through the element head 54 and therefore provide a safe and reliable apparatus. The heating chamber and the separation of the steam through the steam tube 25 from the water outlet 24 gives another advantage in that water can be dispensed without spitting and localized hot spots on the heating element from micro-boiling.

FIGS. 16 to 19 show different views of a slightly different embodiment to that shown in FIGS. 5 to 15, for which the majority of the components are the same. The main difference is that the flow heaters 218, 220 run vertically between the distribution plenum block 216 and the heating chamber 222. The distribution plenum block 216 has two horizontal inlets 238 to either side of a diaphragm therein (not shown but arranged as shown in FIG. 8). The flow heaters 218, 220 exit the distribution plenum block 216 vertically and enter the heating chamber 222 at their opposite ends. The heating chamber 222 is rotated through 90 degrees compared to the heating chamber shown in the embodiment of FIGS. 5 to 15. Also shown is a standard immersed element control unit 258 which is fixed to the other side of an immersed element head plate 254 from the heating chamber 222. In this embodiment the outlet spout 224 exits the heating chamber 222 horizontally, and has a steam tube 225 coaxial within it.

Figure 18:
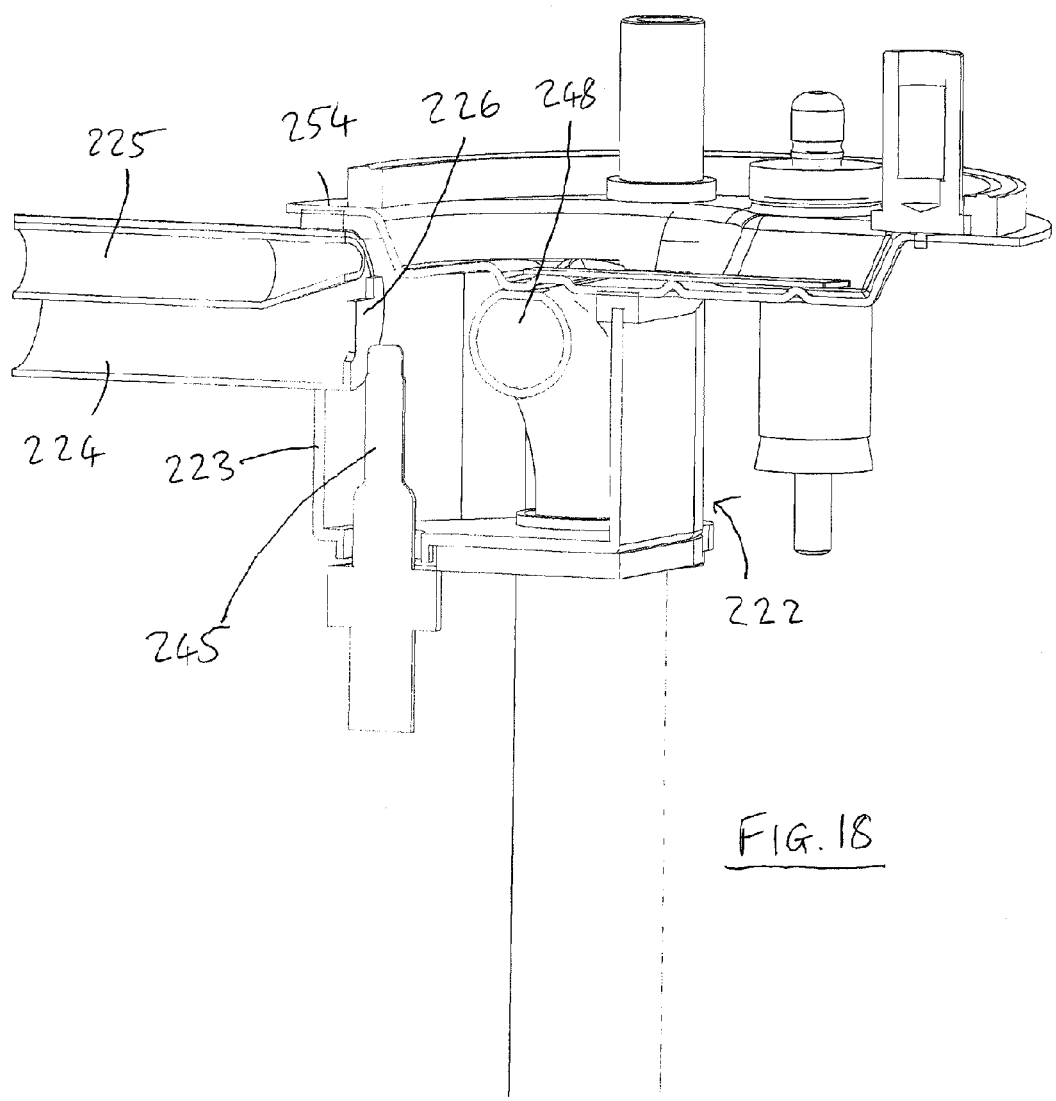
FIGS. 18 and 19 are vertical sections showing the interior of the heating chamber of FIGS. 16 and 17.
Figure 19:
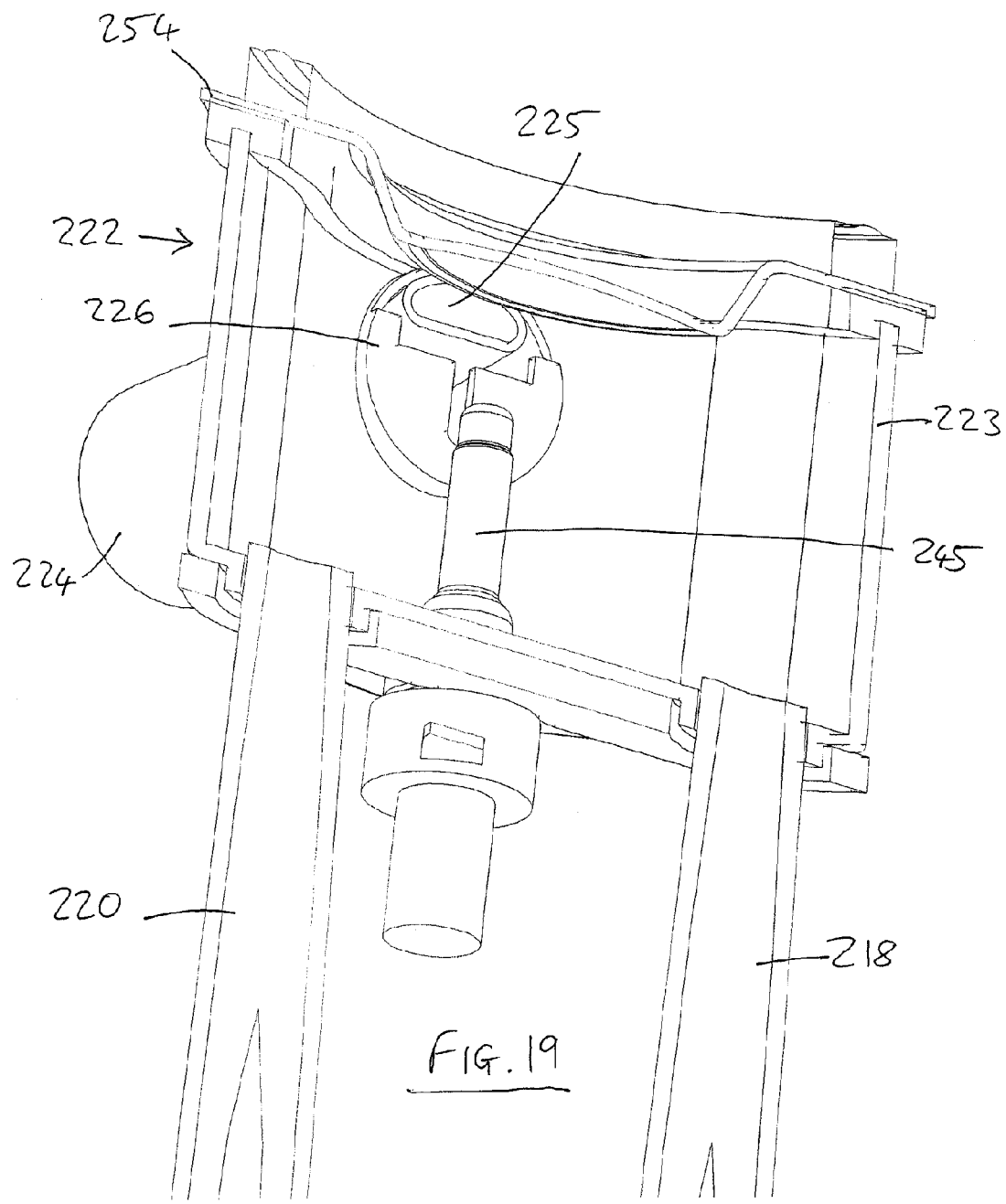

The interior of the heating chamber 222 is best seen from the view of FIGS. 18 and 19. From here it can be seen that the chamber 222 formed by the stainless steel cup 223 is broadly of a squat cylindrical shape although its internal volume is limited by the bent portion of the heating element 248. The water outlet tube 224 exits from an upper part of the heating chamber 222, and has its lower portion covered by a weir 226. The steam outlet tube 225 has its mouth at the top of and within the water outlet tube 224. A thermistor 245 projects through the base of the heating chamber 222 and has its tip at the level of the bottom of the weir 226.

The weir 226 has a wider cross section in its upper portion and a narrower cross section (a slit) in its lower portion. This restricts the flow of water into the outlet tube 224 thus ensuring that the heating element 248 remains adequately covered in water, so preventing overheating in normal use. A second function of the shape of the weir 226 is that, by having a smaller cross section in its lower portion, at the level of the bottom of the heating element 248, the heating chamber 222 drains quickly if the water flow from the flow heaters 218, 220 is suddenly reduced or stopped—owing, for example, to a blockage in the flow heaters 218, 220. This causes the highest part of the heating element 248 to overheat which can quickly be sensed via the hot return, though the minimum level of the top of the outlet tube 224 is still high enough for some water to remain in the bottom of the heating chamber 222 to provide a reliable temperature measurement from the thermistor 245. As in the previous embodiment, the cross sectional area of the mouths of the steam tube 225 and the outlet tube 224 are chosen such that the heating chamber 222 becomes slightly pressurized (e.g. to about 1 bar) during operation.

Operation of the embodiment of the apparatus shown in FIGS. 16 to 19 is very similar to that described for the previous embodiments. The main difference is the effect of the weir in the heating chamber 222. When water begins to fill the heating chamber 222 after passing out of the flow heaters 218, 220, the curved portion of the heating element 248 is covered during normal operating conditions.

The temperature of the water in the heating chamber 222 is monitored by the thermistor 245 which projects into the heating chamber 222 near the outlet 224. The curved part of the heating element 248 continues to heat the water in the heating chamber 222. Any steam produced from micro-boiling during heating of the water in the heating chamber 222 can easily escape by means of the steam tube 225 which opens at the top of it. The steam passes through the steam tube 225 and to a convenient outlet, though as it runs coaxially through the water outlet tube 224 it advantageously helps to keep the heated water warm as it passes from the heating chamber 222 into the user's cup.

Referring particularly to FIGS. 18 and 19, it can be seen that as the water level in the heating chamber 222 rises level with and above the lowest part of the weir 226, it will start to pour out over the weir 226 and through the outlet tube 224 and into the user's cup. The pumped flow rate and the power of the element 248 are matched such that by the time the water leaves the heating chamber overt the weir 226 and through the outlet tube 224 it is at the required temperature. The height and shape of the weir 226 is chosen to ensure that the element 248 remains covered in water during normal flow rate but quickly drains the heating chamber 222 if the flow rate drops in order to quickly trigger a snap-acting bimetallic actuator connected to the other side of the hot return (not shown in this embodiment).

As in the previous embodiment, the heating chamber and the separation of the steam through the steam tube 225 from the water outlet 224 gives the advantage that water can be dispensed without spitting and localized hot spots on the heating element from micro-boiling.

Although this invention has been shown and described with respect to the detailed embodiments thereof, it will be understood by those skilled in the art that various changes in form and detail thereof may be made without departing from the spirit and the scope of the invention.

What is claimed is:

1. A flow heater comprising a heating element, a first heating region heated by said heating element for heating liquid flowing therethrough to a first temperature below boiling, and a second heating region for heating said liquid to a second temperature below boiling, said second region being arranged to permit the exit of steam therefrom separately from, and at the same time as, exit of heated liquid, wherein the flow rate of the liquid and heating power applied to the second region are set such that bulk boiling of said liquid does not takes place in the second region.

2. A flow heater as claimed in claim 1, wherein said heating element extends into the second heating region.

3. A flow heater as claimed in claim 1, wherein said heating element is provided on the outside of a channel forming the first heating region.

4. A flow heater as claimed in claim 1, wherein said heating element comprises a sheathed resistance heating element.

5. A flow heater as claimed in claim 4 wherein part of said heating element is bonded to a metal head plate to form a hot return.

6. A flow heater as claimed in claim 1 wherein the first region comprises a channel having an inlet arranged so as to introduce liquid thereto along a direction offset from the central axis of the channel.

7. A flow heater as claimed in claim 1 comprising an arrangement for controlling the temperature of liquid supplied by the heater.

8. A flow heater as claimed in claim 7 wherein said arrangement for controlling the temperature comprises an arrangement for altering the flow rate of liquid through the heater.

9. A flow heater as claimed in claim 1 arranged to cause water to flow through it after a delay interval relative to energisation of the heating element.

10. A flow heater as claimed in claim 1 arranged so that the heating element is switched off before the flow of liquid through it is stopped.

11. A flow heater as claimed in claim 1 comprising a temperature sensor in the first heating region for determining the output temperature of a liquid.

12. A flow heater as claimed in claim 1 comprising a pump for driving liquid through the flow heater.

13. A flow heater as claimed in claim 1 comprising an arrangement to permit automatic outflow of liquid from the second region upon the liquid therein reaching a predetermined level.

14. A flow heater as claimed in claim 13 comprising a weir arranged such that liquid escapes over the weir and out of the second region when the water level in the second region exceeds a predetermined height.

15. A flow heater as claimed in claim 14 wherein the height of the weir varies around its perimeter.

16. A flow heater as claimed in claim 13 wherein the second region comprises an outlet, the surface area of which increases with the height of liquid in the second region.

17. A flow heater as claimed in claim 1, comprising a steam outlet configured to direct steam from the second region into a receptacle placed to receive heated liquid dispensed from the flow heater.

18. A flow heater as claimed in claim 17 comprising a steam path and a heated liquid path in a coaxial tube arrangement extending into the second region.

19. A flow heater as claimed in claim 1 wherein the first region comprises a channel arranged to run vertically.

20. An appliance for providing heated water on demand comprising a flow heater as claimed in claim 1.

21. An appliance as claimed in claim 20 configured to provide a steam path between the second region and atmosphere, the steam path being sufficiently restricted to give rise to a pressure difference across it in use of between 0.1 and 1 bar.

22. A flow heater comprising a heating element, a first heating region heated by said heating element for heating liquid flowing therethrough to a first temperature below boiling, and a second heating region for heating said liquid to a second temperature below boiling, said second region being arranged to permit the exit of steam therefrom separately from, and at the same time as, exit of heated liquid.

23. A flow heater comprising a heated flow conduit for heating liquid therein to a first temperature below boiling and a final heating chamber for heating said liquid to a second temperature below boiling wherein said final heating chamber comprises a space above the liquid surface for allowing the escape of steam from the liquid surface wherein the flow rate of the liquid and heating power applied to the final heating chamber are set such that bulk boiling of said liquid does not takes place in the final heating chamber.

24. A flow heater as claimed in claim 23, wherein said heated flow conduit comprises one side of a heat exchanger.

25. A flow heater as claimed in claim 23, wherein said heated flow conduit comprises an electric heating element.

* * * * *